US012126700B2

(12) United States Patent
Wantland et al.

(10) Patent No.: US 12,126,700 B2
(45) Date of Patent: *Oct. 22, 2024

(54) SYSTEM AND METHOD FOR SELECTING AND PROVIDING AVAILABLE ACTIONS FROM ONE OR MORE COMPUTER APPLICATIONS TO A USER

(71) Applicant: Google LLC, Mountain View, CA (US)

(72) Inventors: Tim Wantland, Bellevue, WA (US); Brandon Barbello, Mountain View, CA (US); Robert Berry, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,509

(22) Filed: Oct. 24, 2023

(65) Prior Publication Data

US 2024/0056512 A1    Feb. 15, 2024

Related U.S. Application Data

(63) Continuation of application No. 18/082,205, filed on Dec. 15, 2022, now Pat. No. 11,831,738, which is a
(Continued)

(51) Int. Cl.
*H04L 67/63*   (2022.01)
*G06N 20/00*   (2019.01)

(52) U.S. Cl.
CPC ............ *H04L 67/63* (2022.05); *G06N 20/00* (2019.01)

(58) Field of Classification Search
CPC .............................. H04L 67/327; G06N 20/00
(Continued)

(56) References Cited

U.S. PATENT DOCUMENTS 10,592,515 B2   3/2020   Kumar
10,686,738 B2   6/2020   Daniel
(Continued)

FOREIGN PATENT DOCUMENTS

CN    105068661    11/2015
CN    105718035    6/2016
(Continued)

OTHER PUBLICATIONS

Chinese Search Report for Corresponding to Application No. 2019800811017 dated Aug. 23, 2023, English translation unavailable, 2 pages.
(Continued)

*Primary Examiner* — Wing F Chan
*Assistant Examiner* — Leon Y Tseng
(74) *Attorney, Agent, or Firm* — DORITY & MANNING P.A.

(57) ABSTRACT

A computing system can be configured to input model input that includes context data into a machine-learned model and receive model output that describes one or more semantic entities referenced by the context data. The computing system can be configured to provide data descriptive of the semantic entity or entities to the computer application(s) and receive application output(s) respectively from the computing application(s) in response to providing the data descriptive of semantic entity or entities to the computer application(s). The application output(s) received from each computer application can describe available action(s) of the corresponding computer application with respect to the semantic entity or entities. The computing system can be configured to provide at least one indicator to a user that describes the available action(s) of the corresponding computer applications with respect to the semantic entity or entities.

20 Claims, 20 Drawing Sheets

Related U.S. Application Data continuation of application No. 17/311,506, filed as application No. PCT/US2019/013029 on Jan. 10, 2019, now Pat. No. 11,553,063.

(60) Provisional application No. 62/776,586, filed on Dec. 7, 2018.

(58) Field of Classification Search
USPC .......................................................... 709/203
See application file for complete search history.

(56) References Cited

U.S. PATENT DOCUMENTS

| | | |
|---|---|---|
| 10,768,796 B2 | 9/2020 | Kim |
| 2005/0197823 A1 | 9/2005 | Werner et al. |
| 2013/0091463 A1 | 4/2013 | Nordstrom et al. |
| 2014/0188956 A1 | 7/2014 | Subba et al. |
| 2016/0253052 A1 | 9/2016 | Nordstrom et al. |
| 2016/0283055 A1 | 9/2016 | Haghighat et al. |
| 2016/0350304 A1 | 12/2016 | Aggarwal et al. |
| 2018/0077100 A1 | 3/2018 | Sama et al. |
| 2018/0225032 A1 | 8/2018 | Jones et al. |
| 2018/0246978 A1 | 8/2018 | Marcin et al. |
| 2018/0314755 A1 | 11/2018 | Curin |
| 2020/0125586 A1 | 4/2020 | Rezaeian et al. |
| 2022/0043964 A1 | 2/2022 | Stenerson et al. |

FOREIGN PATENT DOCUMENTS

| | | |
|---|---|---|
| EP | 3404654 A1 | 11/2018 |
| JP | 2014/518419 | 7/2014 |
| JP | 2016/508268 | 3/2016 |
| JP | 2018/041460 | 3/2018 |
| JP | 2018/523144 | 8/2018 |
| JP | 2018/530026 | 10/2018 |
| JP | 2018/174000 | 11/2018 |
| KR | 2017/0117590 | 10/2017 |

OTHER PUBLICATIONS

International Preliminary Report on Patentability for Application No. PCT/US2019/013029, mailed Jun. 17, 2021, 10 pages.
International Search Report for Application No. PCT/US2019/013029, mailed Aug. 8, 2019, 2 pages.

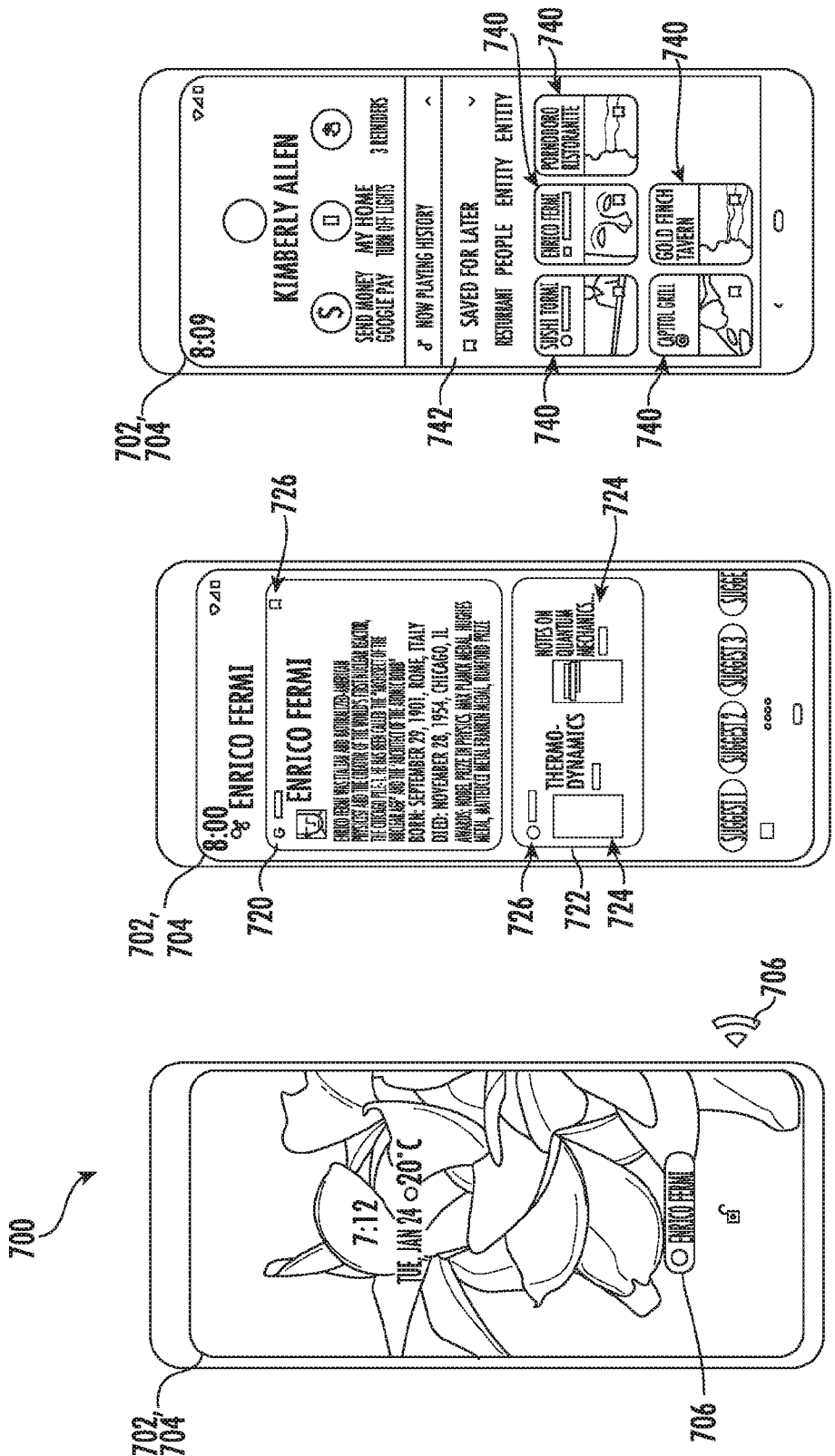

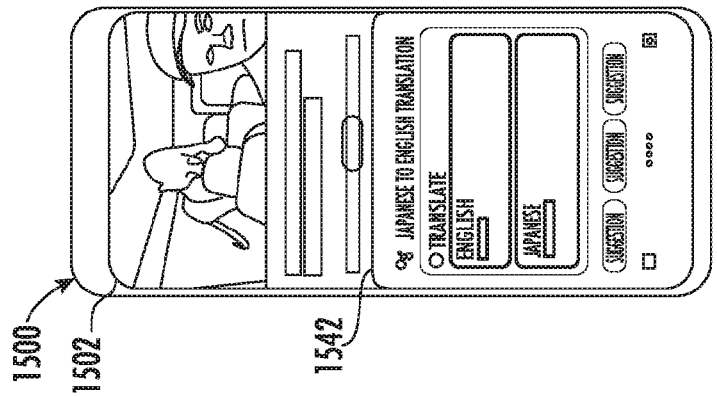

SYSTEM AND METHOD FOR SELECTING AND PROVIDING AVAILABLE ACTIONS FROM ONE OR MORE COMPUTER APPLICATIONS TO A USER

PRIORITY CLAIM

The present application is a continuation of U.S. application Ser. No. 18/082,205 having a filing date of Dec. 15, 2022, which is a continuation of U.S. application Ser. No. 17/311,506 having a filing date of Jun. 7, 2021, now issued U.S. Pat. No. 11,553,063, which is based upon and claims the right of priority under 35 U.S.C. § 371 to International Application No. PCT/US2019/013029 filed on Jan. 10, 2019, which claims the benefit of U.S. Provisional Application Ser. No. 62/776,586 filed Dec. 7, 2018. Applicant claims priority to and the benefit of each of such applications and incorporates all such applications herein by reference in their entirety.

FIELD

The present disclosure relates generally to interaction between a computing system and computer applications operable on the computing system. More particularly, the present disclosure relates to systems and related methods for selecting and providing available actions from one or more computer applications to a user.

BACKGROUND

Computing devices (e.g., desktop computers, laptop computers, tablet computers, smartphones, wearable computing devices, and/or the like) are ubiquitous in modern society. They can support communications between their users, provide their users with information about their environments, current events, the world at large, and/or the like. A myriad of different computer applications are operable on such computing devices for performing a wide variety of actions. The user typically must manually select a particular computer application according to the action that the user wishes to perform.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system can include at least one processor. The computing system can include a machine-learned model configured to receive a model input that includes context data, and, in response to receipt of the model input, output a model output that describes one or more semantic entities referenced by the context data. The computing system can include one or more computer applications. The computing system can include at least one tangible, non-transitory computer-readable medium that stores instructions that, when executed by the at least one processor, cause the at least one processor to perform operations. The operations can include inputting the model input into the machine-learned model and receiving, as an output of the machine-learned model. The model output can describe the one or more semantic entities referenced by the context data. The operations can include providing data descriptive of the one or more semantic entities to the one or more computer applications. The operations can include receiving one or more application outputs respectively from the one or more computing applications in response to providing the data descriptive of the one or more semantic entities to the one or more computer applications. The application output received from each computer application can describe one or more available actions of the corresponding computer application with respect to the one or more semantic entities. The operations can include providing at least one indicator to a user of the computing system. The at least one indicator can describe at least one of the one or more available actions of the corresponding computer applications with respect to the one or more semantic entities.

Another example aspect of the present disclosure is directed to a computer-implement method for selecting and providing available actions from one or more computer applications to a user. The method can include inputting, by one or more computing devices, a model input that includes context data into a machine-learned model that is configured to receive the model input, and, in response to receipt of the model input, output a model output that describes one or more semantic entities referenced by the context data. The method can include receiving, by the one or more computing devices, as an output of the machine-learned model, the model output. The model output can describe the one or more semantic entities referenced by the context data. The method can include providing, by the one or more computing devices, data descriptive of the one or more semantic entities to the one or more computer applications. The method can include receiving, by the one or more computing devices, one or more application outputs respectively from the one or more computing applications in response to the providing the data descriptive of the one or more semantic entities to the one or more computer applications. The application output received from each computer application can describe one or more available actions of the corresponding computer application with respect to the one or more semantic entities. The method can include providing, by the one or more computing devices, at least one indicator to a user of the computing system. The at least one indicator can describe at least one of the one or more available actions of the corresponding computer applications with respect to the one or more semantic entities.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 7A depicts an example mobile computing device in a first state in which ambient audio mentioning a historical figure is detected and an indicator is displayed in a lock screen of the mobile computing device according to aspects of the present disclosure.

FIG. 7B depicts the example mobile computing device of FIG. 7A in a second state in which indicators are displayed describing available actions with respect to the historical figure according to aspects of the present disclosure.

FIG. 7C depicts the example mobile computing device of FIG. 7A in a third state in which indicators have been "bookmarked" for later viewing according to aspects of the present disclosure.

FIG. 15A depicts an example mobile computing device in which text is displayed in a user interface of the mobile computing device according to aspects of the present disclosure.

FIG. 15B depicts the example mobile computing device of FIG. 15A in a second state in which indicators are displayed describing available actions with respect to portions of the text according to aspects of the present disclosure.

FIG. 15C depicts the example mobile computing device of FIG. 15A in a third state in which indicators are displayed describing further available actions with respect to the portions of the text according to aspects of the present disclosure.

Figure 1A:
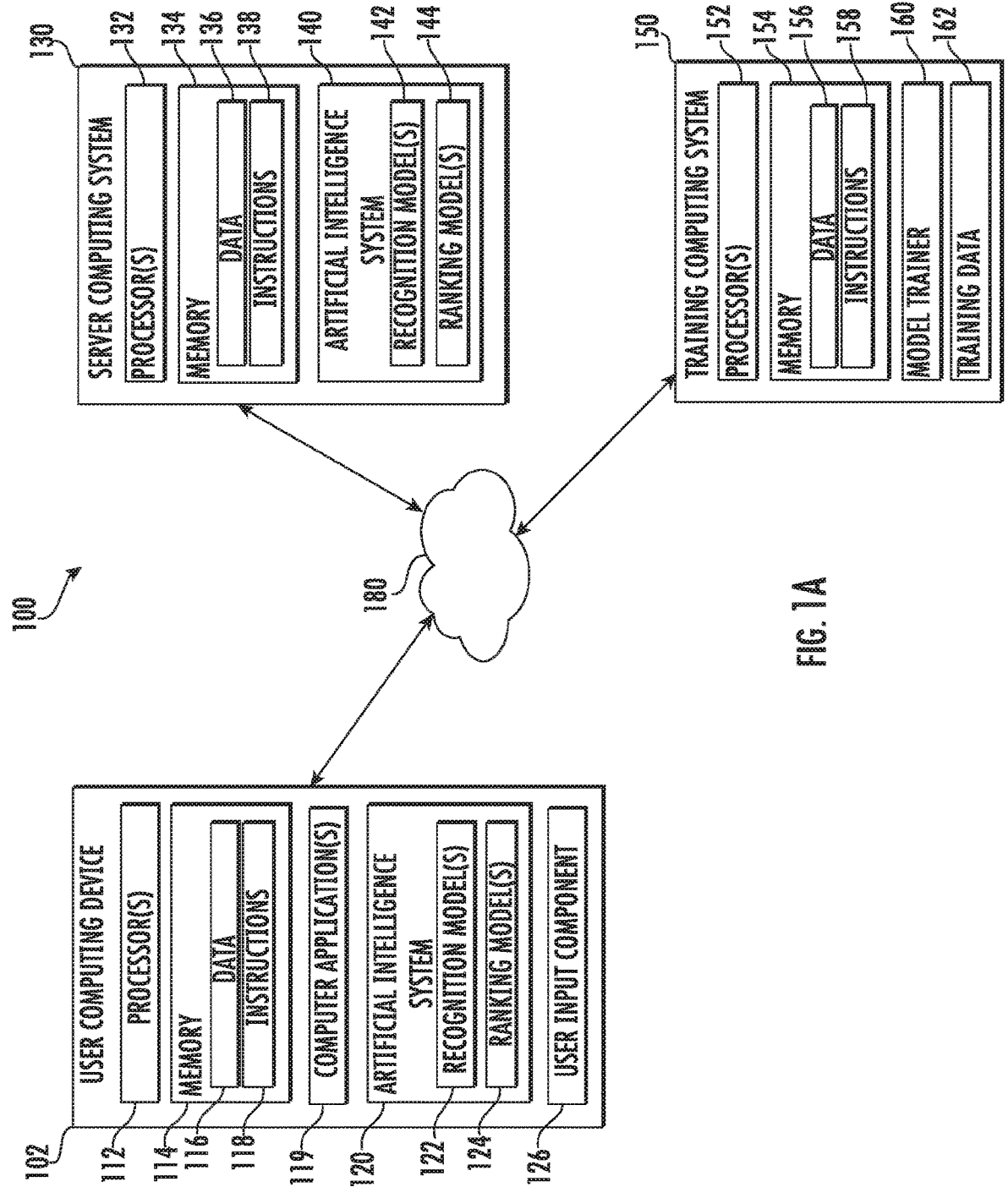
FIG. 1A depicts a block diagram of an example computing system according to example embodiments of the present disclosure.

Reference numerals that are repeated across plural figures are intended to identify the same features in various implementations.

DETAILED DESCRIPTION

Overview

Example aspects of the present disclosure are directed to systems and related methods for selecting and providing available actions from one or more computer applications to a user. The systems and related methods herein may provide a system or platform (e.g., including a pre-defined application programming interface (API)) through which the computing system can intelligently provide prompts, suggestions or hints (e.g., within "surface chips") to a user about contextually-relevant actions that can be performed by one or more computing applications, such as applications residing on a mobile device. In doing so, the systems and related methods may assist a user in performing a technical task, as discussed in more detailed further below, by means of a guided human-machine interaction process. The computing system can include an artificial intelligence system (e.g., including one or more machine-learned models) that detects semantic entities from context data (e.g., information displayed, detected, or otherwise processed by the computing system). The computing system can query or otherwise interact with computer applications, for example through a pre-defined API, to receive available contextually-relevant actions from the computer applications. The pre-defined API can describe rules, protocols, or other information about how the computing system and computer applications interact. One or more indicators (e.g., visual indicators) can be provided to the user to indicate the available actions of the computer applications. This configuration or platform can encourage application developers to design applications that are configured to interface with the computing system as described herein. As a result, the computing system can provide relevant prompts, suggestions or hints from computer applications to the user in a more reliable, intelligent and helpful manner, for example so as to guide a user through performance of a technical task.

As one example, the computing system can recognize one or more semantic entities referenced by text displayed in a user interface, such as a restaurant name. The computing system can provide data descriptive of the semantic entity to the computer application (e.g., according to the pre-defined API or other protocol). The data can include the restaurant name and/or additional information about the location or context in which the restaurant name was displayed in the user interface (e.g., in a text messaging application, in an article displayed in a web browsing application, etc.) The computing system can receive (e.g., according to the pre-defined API or other protocol) one or more application outputs from the computer application(s) in response to the data descriptive of the semantic entity. For instance, the computer applications can format, transmit, and/or alert the computing system about the application output(s) according to rules or protocols specified by the pre-defined API. The computing system can provide indicator(s) to the user that describe or suggest available actions from the computer application(s) (e.g., translating text displayed with the restaurant name, making a reservation using a reservation application, reading a review using a review application, and/or navigating to the restaurant using a navigation application).

Importantly, the user can be provided with controls allowing the user to make an election as to both if and when systems, programs, or features described herein may enable collection of user information (e.g., ambient audio, text presented in the user interface, etc.). In addition, certain data may be treated in one or more ways before it is stored or used, so that personally identifiable information is removed. For example, a user's identity may be treated so that no personally identifiable information can be determined for the user. Thus, the user may have control over what information is collected about the user, how that information is used, and what information is provided to the user.

According to one aspect of the present disclosure, a computing system can include a machine-learned model (e.g., a recognition model) and one or more computer applications. The machine-learned model can be configured to receive a model input that includes context data, and output a model output that describes one or more semantic entities referenced by the model input. Examples of context data can include text displayed in a user interface, audio played or processed by the computing system, audio detected by the computing system, information about the user's location (e.g., a location of a mobile computing device of the computing system), calendar data, and/or contact data. For instance, context data can include ambient audio detected by a microphone of the computing system and/or phone audio processed during a phone call. Calendar data can describe future events or plans (e.g., flights, hotel reservations, dinner plans etc.) Example semantic entities that can be described by the model output include a word or phrase recognized in the text and/or audio. Additional examples includes information about the user's location, such as a city name, state name, street name, names of nearby attractions, and the like.

The computing system can be configured to provide data descriptive of the one or more semantic entities to one or more computer applications. The data may be or include the semantic entity and/or additional contextual information about the semantic entity. For instance, the data may include, for example, translations of text into other languages, text captions of audio played by the computing system, information concerning access to one or more particular buildings, e.g. for wheelchair users, or a name of a song recognized in a video played by the computing system. The data may also include other associated information, such as the name of the artist performing the song.

The computing system can be configured to receive one or more application outputs from the one or more computing applications in response to the providing the data descriptive of the one or more semantic entities. The application output received from each computer application can describe one or more available actions of the corresponding computer application with respect to the one or more semantic entities. To use the examples described above, the application output(s) can include translations of text into one or more other languages, text captions of audio played by the computing system, e.g. for users with impaired hearing, information concerning access to one or more particular buildings, e.g. for wheelchair users, or the name of a song and/or artist that can by streamed by a music streaming application. As another example, in response to receiving a semantic entity that includes the name of a city (e.g., that the user plans on visiting), the application output(s) can include potential lodging and/or car rentals that are available in that city from a travel reservation application.

The computing system can be configured to provide at least one indicator to the user that describes one or more of the available actions of the corresponding computer applications. The indicator may be or include a graphical indicator presented in the user interface, such as a word or phrase descriptive of the available action. For instance, in the above example concerning a song name, the indicator could be or include a button labeled "Play" next to the name of the song that was recognized in the video. As another example, the graphical indicator could include translations of text into other languages, text captions of played audio, and/or other accessibility information such as locations of wheelchair entrances. As another example, the graphical indicator could be or include movie times and/or theater locations based on a semantic entity including a movie title that were displayed in the user interface or included in ambient audio (e.g., audio processed by the computing devices and/or detected by a microphone of the computing device). As yet another example, the indicator could include an audio indicator played to the user. For instance, the audio indicator could include a voice, or other sound, that asks the user if text appearing in the user interface or ambient audio should be translated into a different language.

The indicator can also include or describe identifying information about the computer application that is available to perform the action. As one example, in some implementations, the computer application can provide stylization output that describes aesthetic features, which can include the identifying information. The computing system can display the indicator(s) in the user interface based on the stylization output. The aesthetic features can include one or more of a name of the computer application, a logo, fonts, colors, shapes, locations within the user interface, and/or any other suitable visual characteristic.

In some implementations, the computing system can include an artificial intelligence system (e.g., "Google Assistant"). The artificial intelligence system can include the machine-learned model and performs some or all of the operations described herein. The artificial intelligence system can be separate and distinct from the one or more computer applications but can be capable of communicating with the one or more computer applications. The artificial intelligence system can provide the data that is descriptive of the one or more semantic entities to the computer application(s) and can receive the application output(s) respectively from the computing application(s) via a pre-defined application programming interface.

In some implementations, some or all of the operations described herein can be performed proactively without a user input requesting their performance. The computing system (e.g., the artificial intelligence system) can identify context data while the user is using the computing device without user input requesting such an action. For example, transliteration of text, text captions of audio and/or other accessibility information may be proactively provided by the system without a preceding user input request for the information. Such information may be provided, for example, where a user is known to be interested in receiving information of a certain type. For instance, the user can be reading an article that is displayed in the user interface. The computing system can input some or all of the text of the article into the machine-learned model and receive model output that described semantic entities within the text. The semantic entities can include names or products, accessible entrances and exits, people, events, or other items of interests. The computing system can present one or more indicators in the user interface describing available actions from the computer application(s). The indicator(s) could include emphasis (e.g., highlighting, outlining, underlining, etc.) of the semantic entities optionally coupled with further information about the available action. For example, the semantic entity could include locations of accessible entrances and/or exits to buildings and the indicator could inform the user that a navigation application is available to navigate the user to the entrances/exits along a suitably accessible route, such as route suitable for a wheelchair. In another example, the semantic entity could include the name of a product mentioned in the text of the article, and the indicator could inform the user that a shopping application (e.g., the Amazon app) is available to perform an action, such as purchasing the item.

In some implementations, however, at least the operations of providing the at least one indicator can be performed reactively in response to a user input. The user can perform an action specifically requesting available actions from one or more computer applications (e.g., long press, double tap, speaking a request, etc.). Alternatively, the user can perform an action that does not specifically request available actions, such as highlighting text to copy and paste. The computing system can provide the indicator in response to the user highlighting text. For instance, the user can highlight the name of a city, and the computing system can provide an indicator describing an available action with respect to the city (e.g., reserving lodging in the city).

In some implementations, the computing system can be configured to provide indicators describing less than all of the available actions corresponding with the application output received by the computing system. In other words, the computing system can receive multiple application outputs (e.g., from multiple computer applications) that describe multiple available actions.

The computing system can select a subset, such as a proper subset, of the multiple available actions to provide to the user, for example, based on a variety of factors or data. Examples include relevancy to the one or more semantic entities, past user interactions, a type of the one or more semantic entities, or a type of the one or more available actions.

As an example, available actions can be selected based on a comparison between the type of semantic entity and the type of available action. Semantic entity types can include attractions (e.g., restaurants, landmarks, etc.), media (e.g., text, songs, videos, etc.), locations (e.g., cities, streets, etc.), products, and/or people (e.g., historical figures, authors, contacts etc.). Available action types can include navigation, reservations (e.g., lodging, dining, etc.), displaying media (e.g., text captioned from audio, transliterated text, songs, images, video, etc.) and/or providing information that is not necessarily actionable (e.g., displaying a menu, captioned text, a translation, or other information). Available actions can be selected by matching suitable available action types to the semantic entities. For instance, in response to providing a media-type semantic entity and receiving multiple available action types, the computing system may select (or prefer) available actions that include displaying media.

As another example, available actions can be selected based on past user interactions. Examples past user interactions include a preference to receive a specific type of available action or a preference for actions from a specific computer application or group of computer applications. Thus, the computing system can customize the selection of available actions from the computer application(s) for the user of the computing device.

In some implementations, selection of available actions can be performed by a machine-learned model. A "ranking machine-learned model" can be configured to receive an input that describes the one or more available actions that are described by the output received from each computer application. In response to receipt of the input, the machine-learned model may be configured to output a ranking output that describes a ranking of the available actions. The computing system can be configured to input the input that describes the available action(s) into the ranking machine-learned model, and receive the ranking output that describes the ranking of the respective outputs as an output of the ranking machine-learned model. The computing system can be configured to select the available actions for presentation to the user based on the ranking output. For instance, the highest ranked action(s) (e.g., top single result, top two actions, three actions, etc.) can be selected for presentation to the user.

In some implementations, the computing system can be configured to store the information, such as a "bookmark," that includes or describes the indicators for later viewing by the user. The computer system can be configured to detect a user input action that requests the indicator be saved for later viewing. The computing system can display a "bookmark" icon that is associated with (e.g., displayed near) the indicator. The user can tap or touch the "bookmark" icon to save the indicator(s) to memory for later viewing. The user can view saved indicators in a "saved for later" panel that can be retrieved when the user wishes to re-visit previously provided indicators.

In some implementations, the saved indicators can be grouped together and/or saved, for example, based on context data associated with the production and/or display of the indicators. The saved indicators can be grouped together as being related to a specific entity, event, or location and/or grouped together based on other information. For example, saved indicators can be grouped together as being related to a person (e.g., a contact), based on a type of the available actions and/or computer applications associated with the indicators, a location of the mobile computing device at the time the indicator was provided to the user, a location of the focus of the available action (e.g., a city in which available lodging listing are located, a destination city to which plane tickets were offered), and/or a temporal grouping based on a date or ranges of date (e.g., indicators could be grouped together for a specific vacation or trip).

In some implementations, the computing system can be configured to perform some or all of the operations described herein locally, for example, on a mobile computing device. The mobile device can store the machine-learned model(s) described herein and locally execute the machine-learned model(s). Local execution on the user's mobile device may reduce latency of the system as a whole, as well as reducing network traffic with one or more back-end server computers located remotely from the mobile device. The user can be notified or signaled before information is sent off-device (e.g., for cloud computing). Such signaling can improve user confidence with using features described herein. For example, users may be particularly interested in knowing if or when specific types of context data (e.g., ambient audio detected with a microphone and/or audio collected during a phone call) are transmitted off-device. Thus, in some implementations, some or all context data may remain on-device unless consent is received from the user permitting off-device transmission of the context data.

The systems and methods of the present disclosure can provide a number of technical effects and benefits. As mentioned in some places above, the systems and related methods may operate in a proactive manner to assist a user. In doing so, the systems and methods may reduce the number of user inputs given the system, for example via the user's mobile device, and thereby save computing and power-related resources which would otherwise be required to process such inputs (e.g. requests or searches via a search engine). On-device implementation of the methods, for example via locally stored and executed machine-learned models at a user device, may reduce latency in providing information to assist a user and, furthermore, may reduce network traffic that would otherwise be required in order to request/provide such information from remotely located server computers. The proactive provision of prompts and/or other information of the types discussed above may also provide efficient use of screen real-estate at a user device by presenting information in a manner which facilitates a guided human-machine interaction, for example so as to navigate a wheelchair user to an accessible entrance of a building or so as to provide a hearing-impaired person with text captions of technical information from audio.

With reference now to the Figures, example embodiments of the present disclosure will be discussed in further detail.

Example Devices and Systems

FIG. 1A depicts a block diagram of an example computing system 100 that performs selects and provides available actions from one or more computer applications to a user according to example embodiments of the present disclosure. The system 100 can include a user computing device 102, a server computing system 130, and/or a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more computer applications 119. The computer application(s) can be configured to perform various operations and provide application output as described herein.

The user computing device 102 can store or include an artificial intelligence system 120. The artificial intelligence system 120 can perform some or all of the operations described herein. The artificial intelligence system 120 can be separate and distinct from the one or more computer applications 119 but can be capable of communicating with the one or more computer applications 119.

The artificial intelligence system 120 can include one or more recognition models 122 and/or one or more ranking model(s) 124. The recognition model(s) 122 and/or one or more ranking model(s) 124 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, or other forms of neural networks. Example recognition models 122 are discussed with reference to FIG. 2A. Example ranking model(s) 124 are discussed with reference to FIG. 2B.

In some implementations, the one or more recognition models 122 and/or one or more ranking model(s) 124 can be received from the server computing system 130 over network 180, stored in the user computing device memory 114, and the used or otherwise implemented by the one or more processors 112. In some implementations, the user computing device 102 can implement multiple parallel instances of a single recognition model 122 (e.g., to perform parallel recognition operations across multiple instances of the recognition model 122). In some implementations, the user computing device 102 can implement multiple parallel instances of a ranking model 124 (e.g., to perform parallel ranking operations across multiple instances of the ranking model 124).

More particularly, the recognition model 122 may be configured to recognize one or more semantic entities described by context data. The recognition model 122 may be configured to receive a model input that includes context data, and output a model output that describes one or more semantic entities referenced by the model input. Examples of context data can include text displayed in a user interface, audio played or processed by the computing system, audio detected by the computing system, information about the user's location (e.g., a location of a mobile computing device of the computing system), calendar data, and/or contact data. For instance, context data can include ambient audio detected by a microphone of the computing system and/or phone audio processed during a phone call. Calendar data can describe future events or plans (e.g., flights, hotel reservations, dinner plans etc.) Example semantic entities that can be described by the model output include a word or phrase recognized in the text and/or audio. Additional examples includes information about the user's location, such as a city name, state name, street name, names of nearby attractions, and the like.

The ranking model 124 can be configured to receive an input that describes the one or more available actions that are described by the output received from each computer application. In response to receipt of the input, the machine-learned model may be configured to output a ranking output that describes a ranking of the available actions. The computing system can be configured to input the input that describes the available action(s) into the ranking machine-learned model, and receive the ranking output that describes the ranking of the respective outputs as an output of the ranking machine-learned model. The computing system can be configured to select the available actions for presentation to the user based on the ranking output. For instance, the highest ranked action(s) (e.g., top single result, top two actions, three actions, etc.) can be selected for presentation to the user.

Additionally or alternatively, an artificial intelligence system 140 can be included in or otherwise stored and implemented by the server computing system 130 that communicates with the user computing device 102 according to a client-server relationship. For example, the artificial intelligence system 140 can include a recognition model 142 and/or a ranking model 144. The recognition model 142 and/or the ranking model 144 can be implemented by the server computing system 140 as a portion of a web service. Thus, one or more models 122, 124 can be stored and implemented at the user computing device 102 and/or one or more models 142, 144 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include an artificial intelligence system, which can include one or more machine-learned models 142, 144. For example, the models 142, 144 can be or can otherwise include various machine-learned models such as neural networks (e.g., deep recurrent neural networks) or other multi-layer non-linear models. Example models 140 are discussed with reference to FIGS. 2A and 2B.

The server computing system 130 can train the models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train one or more of the models 122, 124, 142, 144 based on a set of training data 142. The training data 142 can include, for example, publically available data sets, such as labeled or unlabeled images, sounds, etc.

In some implementations, if the user has provided consent, the training examples can be provided by the user computing device 102 (e.g., based on communications previously provided by the user of the user computing device 102). Thus, in such implementations, the model 120 provided to the user computing device 102 can be trained by the training computing system 150 on user-specific communication data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
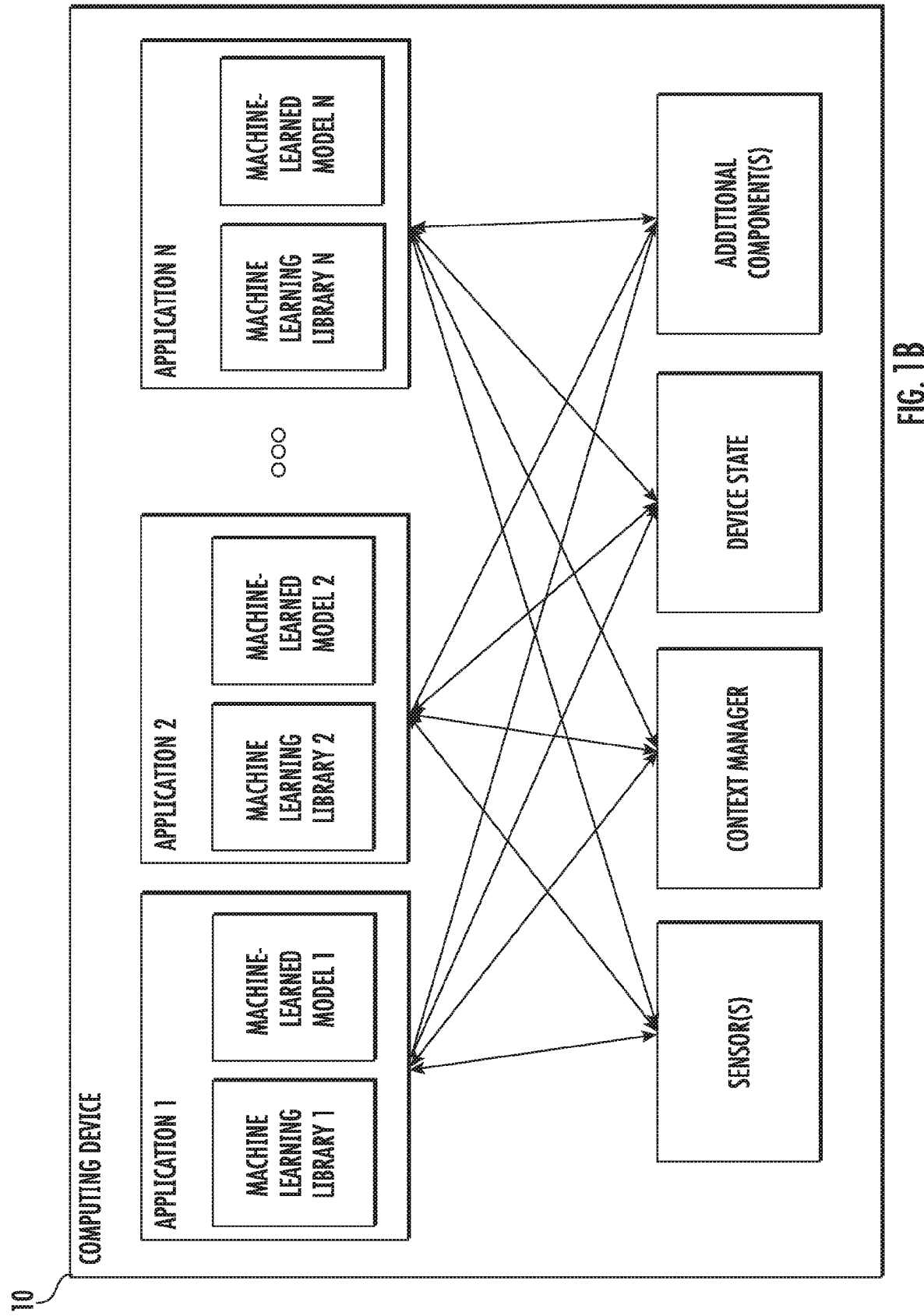
FIG. 1B depicts a block diagram of an example computing system according to example embodiments of the present disclosure.

FIG. 1B depicts a block diagram of an example computing device 10 for selecting and providing available actions from one or more computer applications to a user according to example embodiments of the present disclosure. The computing device 10 can be a user computing device (e.g., a mobile computing device) or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
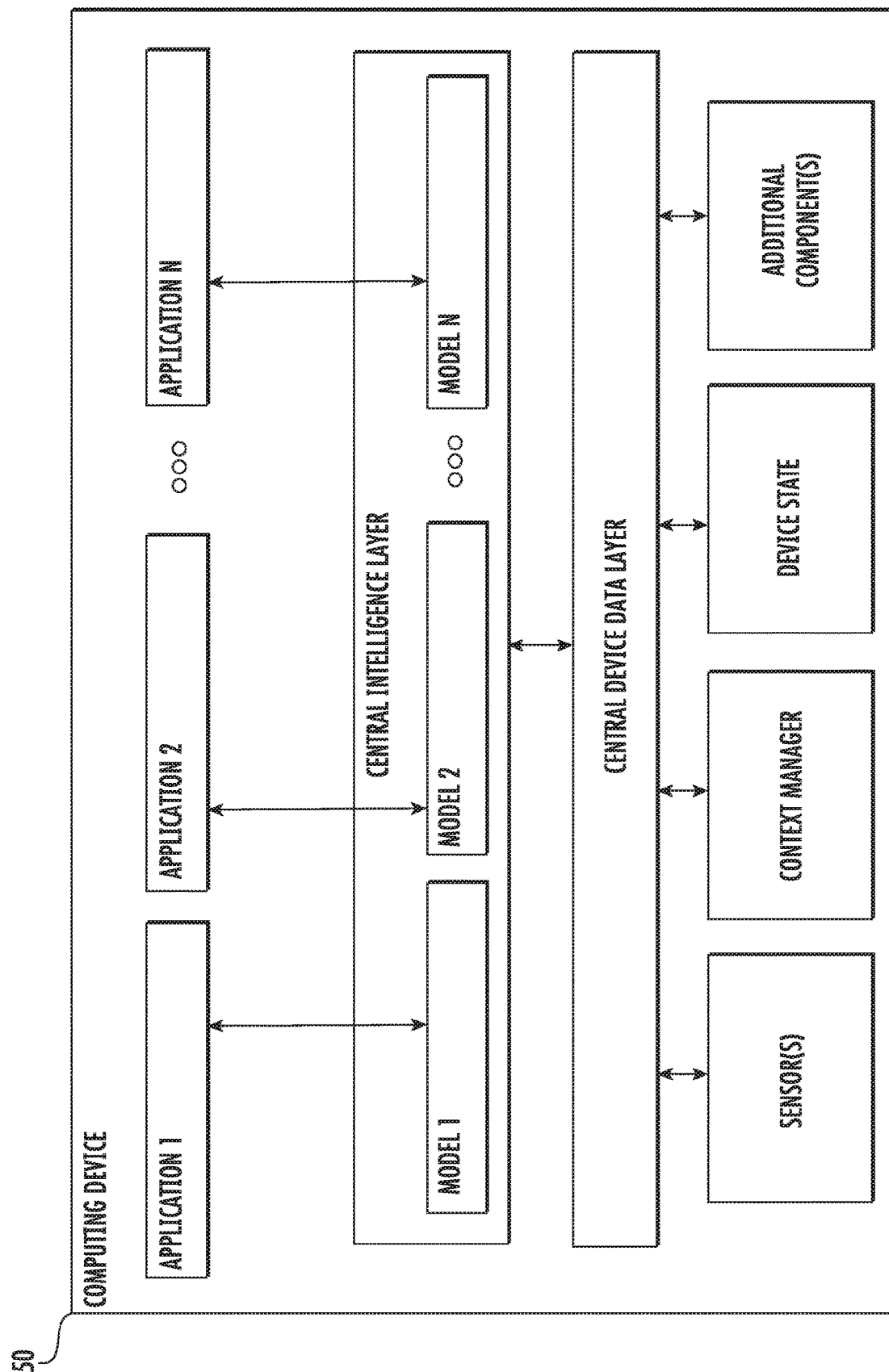
FIG. 1C depicts a block diagram of an example computing system according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 1D:
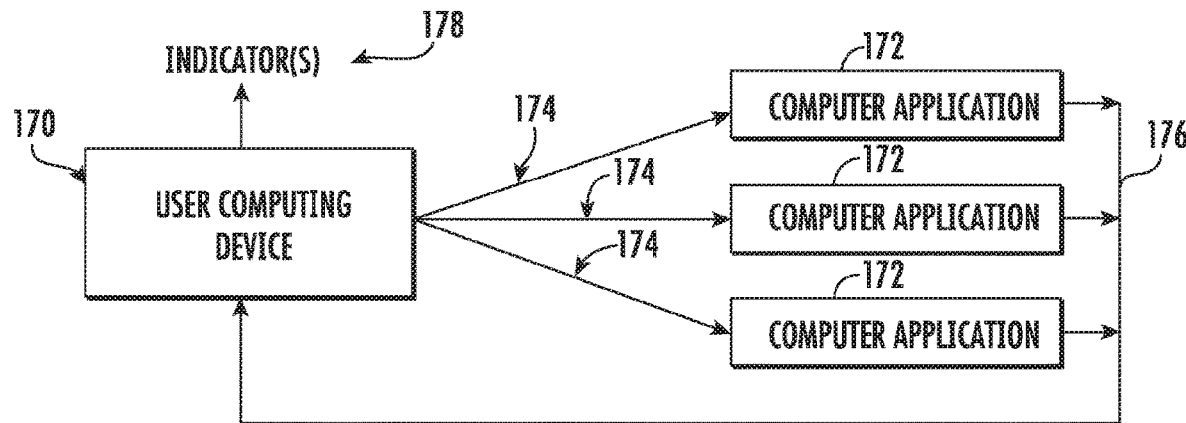
FIG. 1D depicts an example user computing device that is configured to provide data descriptive of one or more semantic entities to one or more computer applications, receive application output from the computer application(s), and provide indicator(s) to the user describing available action(s) that can be performed by the computer application(s).

FIG. 1D depicts an example user computing device 170 (e.g., a mobile computing device) that is configured to select and provide available actions from one or more computer applications 172 to a user according to aspects of the present disclosure. More specifically, the user computing device 170 can be configured to provide data 174 that is descriptive of one or more semantic entities to the one or more computer applications 172. The data may be or include the semantic entity and/or additional contextual information about the semantic entity. For instance, the data may include a name of a song recognized in a video played by the computing system. The data may also include the name of the artist performing the song. The computing system can provide the data 174 that is descriptive of the semantic entity to the computer application according to a pre-defined API or other protocol.

The user computing device 170 can be configured to receive one or more application outputs 176 respectively from the one or more computing applications 172 in response to the providing the data 174 descriptive of the one or more semantic entities to the one or more computer applications 172. The application output 174 received from each computer application can describe one or more available actions of the corresponding computer application 172 with respect to the one or more semantic entities. In the example described above, the application output(s) 174 can include the name of a song and/or artist that can by streamed by a music streaming application. As another example, in response to receiving data 174 including a semantic entity that includes the name of a city (e.g., that the user plans on visiting), the application output(s) 176 can include potential lodging and/or car rentals that are available in that city from a travel reservation application. The computer applications can format, transmit, and/or alert the computing system about the application output(s) according to rules or protocols (e.g., as specified by the pre-defined API).

The user computing device 170 can be configured to provide at least one indicator 178 to the user that describes one or more of the available actions of the corresponding computer applications 172. The indicator 178 may be or include a graphical indicator presented in the user interface, such as a word or phrase descriptive of the available action. For instance, in the above example, the indicator could be or include a button labeled "Play" next to the name of the song that was recognized in the video. As another example, the graphical indicator could be or include movie times and/or theater locations based on a semantic entity including a movie title that were displayed in the user interface or included in ambient audio (e.g., audio processed by the computing devices and/or detected by a microphone of the computing device). As yet another example, the indicator could include an audio indicator played to the user. For instance, the audio indicator could include a voice, or other sound, that asks the user if text appearing in the user interface or ambient audio should be translated into a different language. However it should be understood that any graphical indicator described herein could be provided in audio format within the scope of this disclosure.

The indicator can also include or describe identifying information about the computer application that is available to perform the action. As one example, in some implementations, the computer application can provide stylization output that describes aesthetic features, which can include the identifying information. The computing system can display the indicator(s) in the user interface based on the stylization output. The aesthetic features can include one or more of a name of the computer application, a logo, fonts, colors, shapes, locations within the user interface, and/or any other suitable visual characteristic.

Example Model Arrangements

Figure 2A:
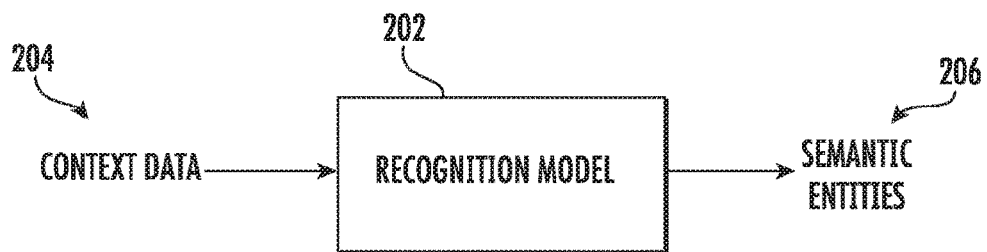
FIG. 2A depicts a machine-learned recognition model according to example embodiments of the present disclosure.

FIG. 2A depicts a block diagram of an example recognition model 202 according to example embodiments of the present disclosure. In some implementations, the recognition model 202 may be configured to receive a model input that includes context data 204, and output a model output that describes one or more semantic entities 206 referenced by the model input. Examples of context data 204 can include text displayed in a user interface, audio played or processed by the computing system, audio detected by the computing system, information about the user's location (e.g., a location of a mobile computing device of the computing system), calendar data, and/or contact data. For instance, context data 204 can include ambient audio detected by a microphone of the computing system and/or audio processed by the computing device (e.g., during a phone call or while playing media, such as a video, podcast, etc.). Calendar data can describe future events or plans (e.g., flights, hotel reservations, dinner plans etc.) Example semantic entities that can be described by the model output include a word or phrase recognized in the text and/or audio. Additional examples includes information about the user's location, such as a city name, state name, street name, names of nearby attractions, and the like.

Figure 2B:
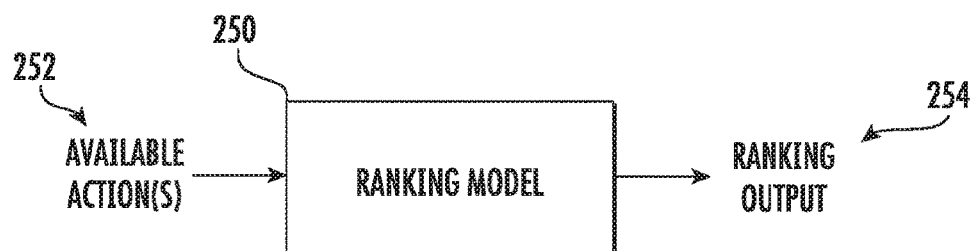
FIG. 2B depicts a machine-learned ranking model according to example embodiments of the present disclosure.

FIG. 2B depicts a ranking model 250 that can be configured to receive an input that describes the one or more available actions 252 that are described by the output received from each computer application. In response to receipt of the input, the machine-learned model may be configured to output a ranking output 254 that describes a ranking of the available actions. The computing system can be configured to input the input that describes the available action(s) 252 into the ranking machine-learned model 250, and receive the ranking output 254 that describes the ranking of the respective outputs as an output of the ranking machine-learned model 250. The computing system can be configured to select the available actions 252 for presentation to the user based on the ranking output 254. For instance, the highest ranked action(s) (e.g., top single result, top two actions, three actions, etc.) can be selected for presentation to the user.

In some implementations, the computing system can include an artificial intelligence system (e.g., "Google Assistant"). The artificial intelligence system can include one or more of the machine-learned models 202, 250 described above with reference to FIGS. 2A and 2B. The artificial intelligence system can perform some or all of the operations described herein. The artificial intelligence system can be separate and distinct from the one or more computer applications but can be capable of communicating with the one or more computer applications. The artificial intelligence system can provide the data that is descriptive of the one or more semantic entities to the computer application(s) and can receive the application output(s) respectively from the computing application(s) via a pre-defined application programming interface.

Example Methods

Figure 3:
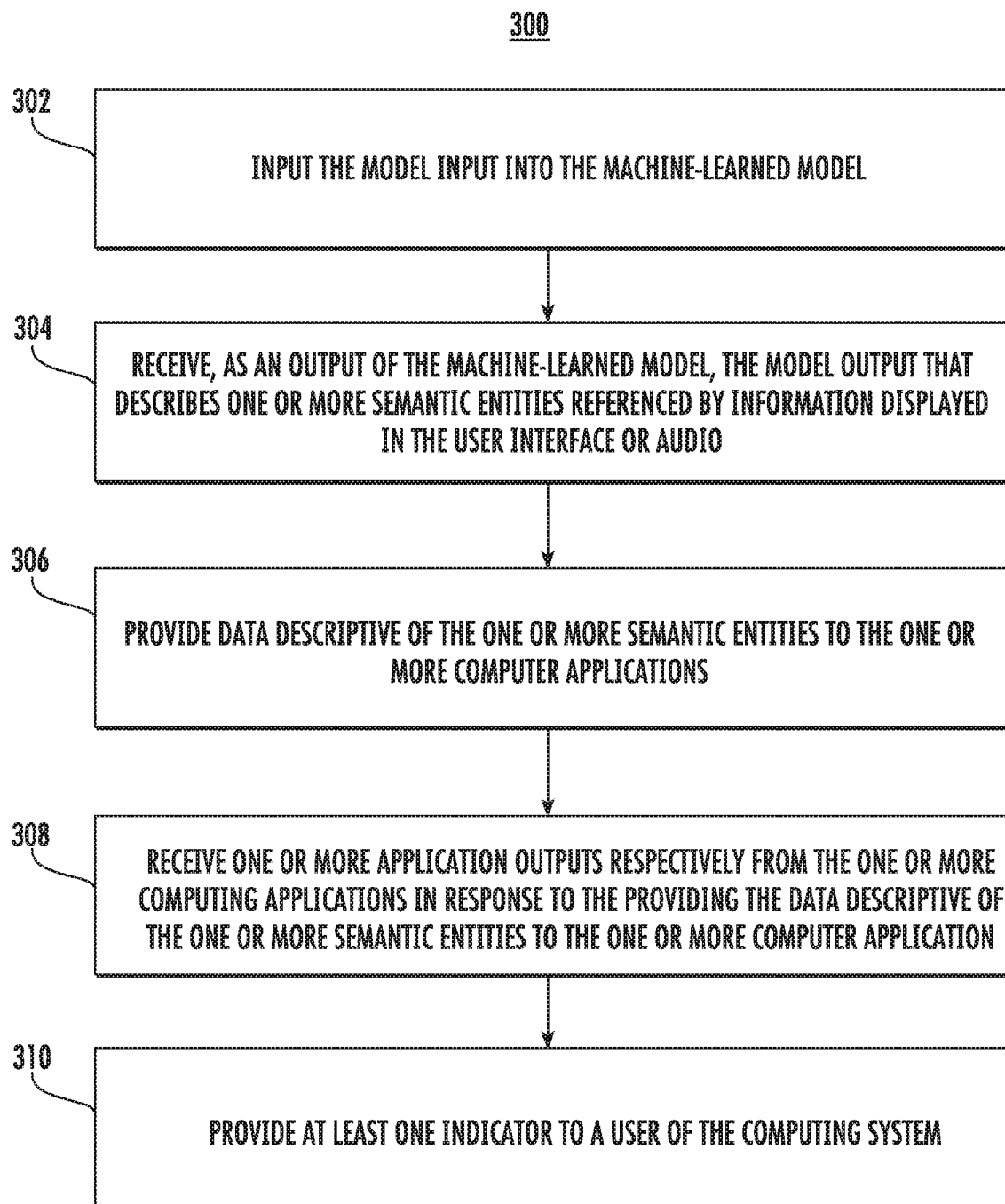
FIG. 3 depicts a flow chart diagram of an example method for selecting and providing available actions from one or more computer applications to a user.

FIG. 3 depicts a flow chart diagram of an example method 300 for selecting and providing available actions from one or more computer applications to a user according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can be configured to input model input into a machine-learned model, such as a ranking machine-learned model, for example as described above with reference to FIG. 2A. The model input can include context data. Examples of context data can include text displayed in a user interface, audio played or processed by the computing system, audio detected by the computing system, information about the user's location (e.g., a location of a mobile computing device of the computing system), calendar data, and/or contact data. For instance, context data can include ambient audio detected by a microphone of the computing system and/or phone audio processed during a phone call. Calendar data can describe future events or plans (e.g., flights, hotel reservations, dinner plans etc.)

In some implementations, the computing system can include an artificial intelligence system (e.g., "Google Assistant"). The artificial intelligence system can include the ranking machine-learned model and can perform some or all of the operations described herein. The artificial intelligence system can be separate and distinct from the one or more computer applications but can be capable of communicating with the one or more computer applications. The artificial intelligence system can provide the data that is descriptive of the one or more semantic entities to the computer application(s) and can receive the application output(s) respectively from the computing application(s) via a pre-defined application programming interface.

At 304, the computing system can be configured to receive, as an output of the machine-learned model (e.g., ranking machine-learned model), model output that describes the semantic entity or entities referenced by the context data. Example semantic entities that can be described by the model output include a word or phrase recognized in text and/or audio described by the context data. Additional examples includes information about the user's location, such as a city name, state name, street name, names of nearby attractions, and the like.

At 306, the computing system can be configured to provide data descriptive of the one or more semantic entities to the one or more computer applications. The data may be or include the semantic entity and/or additional contextual information about the semantic entity. For instance, the data may include a name of a song recognized in a video played by the computing system. The data may also include the name of the artist performing the song. The computing system can provide the data descriptive of the semantic entity to the computer application according to the pre-defined API or other protocol.

At 308, the computing system can be configured to receive one or more application outputs respectively from the one or more computing applications in response to the providing the data descriptive of the one or more semantic entities to the one or more computer applications. The application output received from each computer application can describe one or more available actions of the corresponding computer application with respect to the one or more semantic entities. In the example described above, the application output(s) can include the name of a song and/or artist that can by streamed by a music streaming application. As another example, in response to receiving a semantic entity that includes the name of a city (e.g., that the user plans on visiting), the application output(s) can include potential lodging and/or car rentals that are available in that city from a travel reservation application.

At 310, the computing system can be configured to provide at least one indicator to the user that describes one or more of the available actions of the corresponding computer applications. The indicator may be or include a graphical indicator presented in the user interface, such as a word or phrase descriptive of the available action. For instance, in the above example, the indicator could be or include a button labeled "Play" next to the name of the song that was recognized in the video. As another example, the graphical indicator could be or include movie times and/or theater locations based on a semantic entity including a movie title that were displayed in the user interface or included in ambient audio (e.g., audio processed by the computing devices and/or detected by a microphone of the computing device). As yet another example, the indicator could include an audio indicator played to the user. For instance, the audio indicator could include a voice, or other sound, that asks the user if text appearing in the user interface or ambient audio should be translated into a different language. However it should be understood that any graphical indicator described herein could be provided in audio format within the scope of this disclosure.

The indicator can also include or describe identifying information about the computer application that is available to perform the action. As one example, in some implementations, the computer application can provide stylization output that describes aesthetic features, which can include the identifying information. The computing system can display the indicator(s) in the user interface based on the stylization output. The aesthetic features can include one or more of a name of the computer application, a logo, fonts, colors, shapes, locations within the user interface, and/or any other suitable visual characteristic.

Example Implementations

Figure 4:
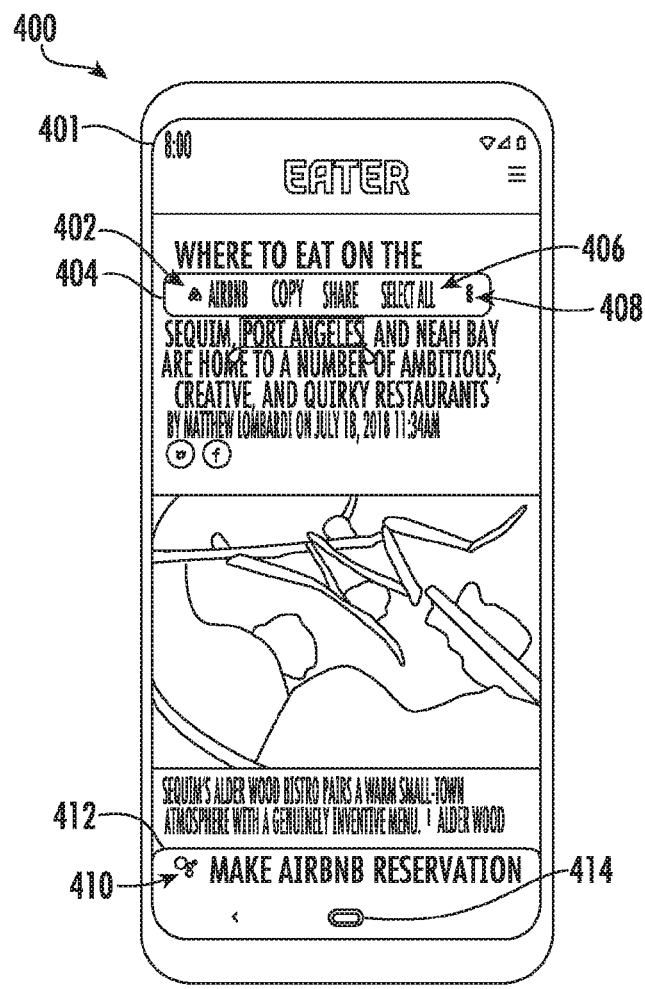
FIG. 4 depicts an example mobile computing device displaying indicators in a user interface that show available actions from computer applications according to aspects of the present disclosure.

FIG. 4 illustrates an example implementation of aspects of the present disclosure. More specifically, FIG. 4 depicts an example mobile computing device 400 displaying indicators 402 in a user interface 401 that show available actions from computer applications according to aspects of the present disclosure. The mobile computing device 400 can correspond with the user computing device 102 of FIG. 1A. The mobile computing device 400 can store or otherwise implement computer applications. In this example, the mobile computing device 400 can display a review of a restaurant produced by a restaurant review application, "Eater."

The mobile computing device 400 can be configured to input model input including context data into a recognition machine-learned model, for example as described with reference to FIG. 2A. In this example, the context data can include some or all of the text displaying in the user interface 401.

The mobile computing device 400 can be configured to receiving model output that describes one or more semantic entities referenced by the context data. In this example, the model output may include the highlighted text. More specifically, in this example, the user has highlighted the name of city, "Port Angeles," in the text displayed in the user interface 401.

The mobile computing device 400 can be configured to provide data descriptive of the semantic entity to one or more computer applications. In this example, the data can include the name "Port Angeles." The mobile computing device 400 can provide the data to several computer applications, including lodging applications, navigation applications, and/or other suitable applications. The mobile computing device 400 can provide the data according to a pre-defined API or other protocol(s).

Additionally, one or more of the computer applications can be "third party" computer applications. In other words, some of all of the computer applications can be developed by entities other than the developer of an operating system and/or of the artificial intelligence system that is operable on the mobile computing device.

The mobile computing device 400 can be configured to select the computer application(s) to which to provide the data descriptive of the one or more semantic entities from a plurality of applications operable on the computing system based on a comparison between the model output and respective information about the plurality of applications. In this example, the mobile computing device 400 (e.g., the artificial intelligence system) can be configured to compare the model output (e.g., including "Port Angeles") with information about potential applications, such as a lodging application, a navigation application, a movie ticket application, a movie review application, a restaurant review application, a restaurant reservation application, etc. The mobile computing device 400 can select one or more applications to which to provide the data (e.g., including "Port Angeles"). In this example, the mobile computing device 400 (e.g., artificial intelligence system) may select the lodging application and/or navigation application based on a comparison of information about the potential applications (e.g., typical input and/or output). For example, the lodging application and/or navigation application may be selected because typical input for such application includes names of cities.

The mobile computing device 400 can be configured to receive application outputs respectively from the computing applications in response to the providing the data descriptive of the semantic entity to the computer applications. The computer applications can format, transmit, and/or alert the computing system about the application output(s) according to rules or protocols (e.g., as specified by the pre-defined API). The application output received from each computer application can describe one or more available actions of the corresponding computer application with respect to the semantic entity. In this example, the application output includes output from a lodging application, "Airbnb." The application output can include information about available lodging options in Port Angeles. The application output can include output from a navigation application and/or searching application.

The mobile computing device 400 can select a subset of the multiple available actions described by the application output(s) to provide to the user. The mobile computing device 400 can select the subset available actions based on a variety of factors or data. Examples include relevancy to the one or more semantic entities, a location of a mobile computing device 400 of the computing system, past user interactions, a type of the one or more semantic entities, or a type of the one or more available actions.

In this example, the mobile computing device 400 can receive application output describing respective available actions from the lodging application, the navigation application, the searching application, and/or additional applications (e.g., restaurant reservation applications, restaurant review applications, etc.). The mobile computing device 400 can select application output for display to the user from the lodging application, for example, based on past user interactions. Examples of past user interactions can include increased use of the lodging application, increased engagement with indicators describing actions from the lodging application, etc., as compared with other applications. Thus, the computing system can customize the selection of available actions from the computer application(s) for the user of the computing device.

In some implementations, selection of available actions can be performed by a machine-learned model, for example a "ranking machine-learned model" as described with reference to FIG. 2B. The mobile computing device 400 can be configured to input an input that describes the available action(s) into the ranking machine-learned model, and receive a ranking output that describes the ranking of the respective outputs as an output of the ranking machine-learned model. The c mobile computing device 400 can be configured to select the available actions for presentation to the user based on the ranking output. For instance, the highest ranked action(s) (e.g., top single result, top two actions, three actions, etc.) can be selected for presentation to the user. In this example, the mobile computing device 400 can input model input that describes application output from two or more computer applications (e.g., the lodging application, the navigation application, the searching application, and/or additional applications (e.g., restaurant reservation applications, restaurant review applications, etc.)). The mobile computing device 400 can receive, as an output from the ranking machine-learned model, a model output that includes a ranking of the computer applications. The mobile computing device 400 can select the available action(s) to provide to the user based on the ranking. In this example, the mobile computing device 400 can select an available action from the lodging application to provide to the user.

More specifically, the mobile computing device 400 can provide the indicator 402 that describes the available action from the lodging application for display in the user interface 401. In this example, the indicator 402 includes the name and logo of the lodging application. If the user performs an input directed to the indicator (e.g., using a user touch action with respect to a touch screen of the mobile computing device 400), the mobile computing device 400 can open the lodging application (or provide output from the lodging application for display in the user interface 401) to show available lodging options in Port Angeles from the lodging application.

The indicator 402 may be provided in a panel 404. Additional available actions or indicators 406 may be displayed in the panel 404. For instance, in this example, options to copy or share the highlighted text plus an option to select all text is also presented in the panel 404. Additionally, vertical ellipses 408 can be displayed in the panel 404. In response to receiving a user input action directed to the vertical ellipses 408, the mobile computing device 400 can display additional indicators from additional computer applications and/or additional information about the indicators 402, 406 currently displayed in the panel 404.

The mobile computing device 400 can display an indicator 410 in an operating system-level navigation bar 412. The operating system-level navigation bar 412 can be displayed during use of multiple applications and/or at a "home screen" of the mobile computing device. In this example, the indicator 410 in the navigation bar 412 includes text offering to "Make Airbnb reservation."

As indicated above, the indicator 402 can also include or describe identifying information about the computer application that is available to perform the action (e.g., a logo or name of the compute application). In some implementations, the computer application can provide stylization output that describes aesthetic features, which can include the identifying information. In this example, the lodging application can provide stylization output that includes the logo of the lodging application for display. The stylization output can include a variety of aesthetic features, such as fonts, colors, shapes, locations within the user interface, and/or any other suitable visual characteristic of the indicator 402.

In some implementations, the mobile computing device 400 can provide an audio indicator that can be played to the user. For instance, the audio indicator could include a voice, or other sound, that asks the user if text appearing in the user interface or ambient audio should be translated into a different language. In this example, the audio indicator could include a voice speaking an English translation of the spoken Spanish. However it should be understood that any graphical indicator described herein could be provided in audio format within the scope of this disclosure.

Additionally, in some implementations, the mobile computing device 400 can provide a visual signal 414 (e.g., in the navigation bar 412). The visual signal 414 can be indicative of a status of the mobile computing device. For example, the visual signal 414 can signal to the user when context data (e.g., the text displayed in the user interface) is or is not being transmitted off-device. As another example, the visual signal 414 can be indicative of a status of the artificial intelligence system. The visual signal 414 can indicate when the artificial intelligence system is collecting context data, performing one or more operations configured to retrieve available actions from the computer application(s) (e.g, "processing" the context data), and/or a confidence associated with the relevancy of the indicator(s) 402, 410 that are provided to the user.

Figure 5A:
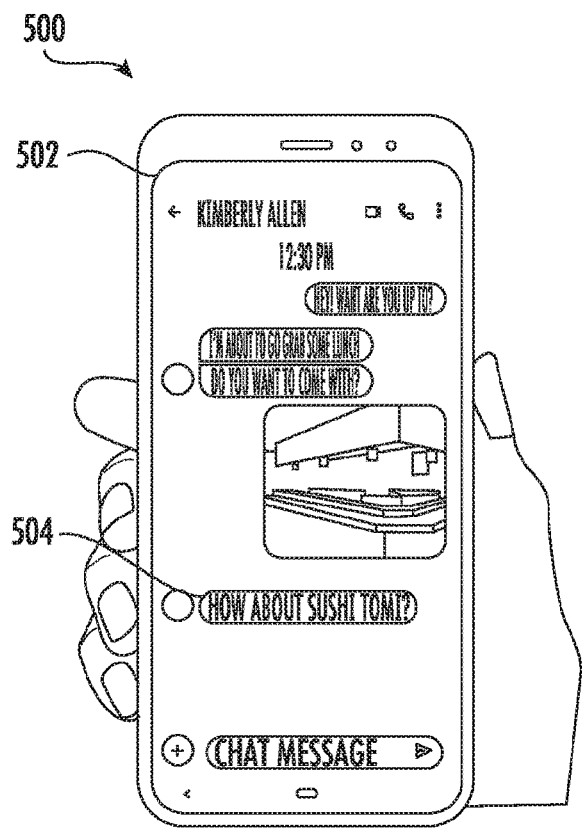
FIG. 5A depicts an example mobile computing device in a first state in which the mobile computing device is displaying a text message exchange in a user interface according to aspects of the present disclosure.
Figure 5B:
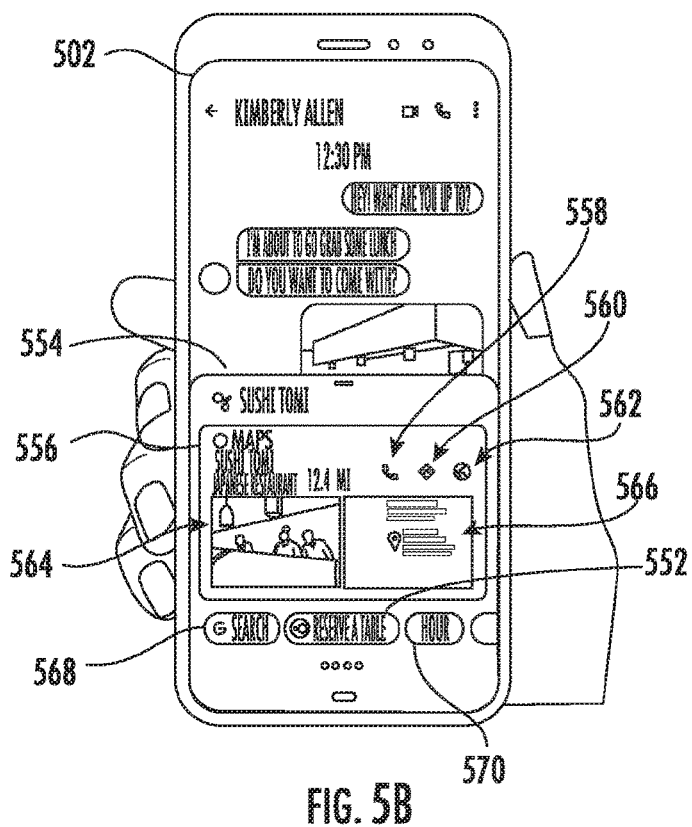
FIG. 5B depicts the mobile computing device of FIG. 5A in a second state in which the mobile computing device is providing indicators of available actions from multiple computer applications with respect to recognized text from the text message exchange of FIG. 5A according to aspects of the present disclosure.

FIGS. 5A and 5B illustrate another example implementation of aspects of the present disclosure. More specifically, FIG. 5A depicts an example mobile computing device 500 in a first state in which the mobile computing device 500 is displaying a text message exchange in a user interface 502 according to aspects of the present disclosure. FIG. 5B depicts the mobile computing device 500 of FIG. 5A in a second state in which the mobile computing device is providing indicators of available actions from multiple computer applications with respect to recognized text from the text message exchange of FIG. 5A according to aspects of the present disclosure. The mobile computing device 500 can input model input including context data into a recognition model, for example as described above with reference to FIG. 2A. In this example, the context data may include some or all of the text displayed in the user interface 502. The recognition model can output model output that describes one or more semantic entities referenced by the context data, such as a name of a restaurant "Sushi Tomi" and/or one or more pieces of information about the text message exchange. Additional examples of semantic entities that could be described by the model output include a name of the person with whom the user is exchanging text messages and/or the word "lunch."

The mobile computing device 500 can be configured to provide data descriptive of the semantic entity or entities to one or more computer applications. In this example, the data can include the semantic entities. The mobile computing device 400 can provide the data to several computer applications, including reservation applications and/or navigation applications. The mobile computing device 400 can provide the data according to a pre-defined API or other protocol(s).

The mobile computing device 500 can be configured to receive application outputs respectively from the computing applications in response to the providing the data descriptive of the semantic entity or entities to the computer applications. The computer applications can format, transmit, and/or alert the computing system about the application output(s) according to rules or protocols (e.g., as specified by the pre-defined API). The application output received from each computer application can describe one or more available actions of the corresponding computer application with respect to the semantic entity. In this example, the application output includes output from a reservation application, "Open Table" and output from a navigation application, "Google Maps." The application output can include information about making reservations and/or the location of the restaurant, Sushi Tomi.

The mobile computing device 500 can be configured to provide the one or more indicators to a user of the computing system by displaying the indicators in the user interface 401. For example, the mobile computing device 500 can display an indicator 552 that describes an available action of making a reservation using the reservation application. The indicator 552 can be displayed in a "half-shelf" 554. The half-shelf 554 can be located in a lower portion of the user interface 502.

The mobile computing device 500 can display an indicator 556 that describes available actions from the navigation application. For example, the available actions can include calling the restaurant (represented by icon 558), navigating to the restaurant (represented by icon 560), and/or viewing a location of the restaurant on a map (represented by icon 562). The indicator 556 can include additional information about the restaurant, such as a photo 564 from a website of the restaurant and/or a map 566.

The mobile computing device 500 can display an indicator 568 that describes an available action that includes searching for the restaurant using a searching application. The mobile computing device 500 can display an indicator 568 that describes an available action that includes searching for the restaurant using a searching application and/or an indicator 570 that describes an available action that includes viewing hours of operation of the restaurant e.g., in a web browser application or restaurant review/reservation application.

Figure 6:
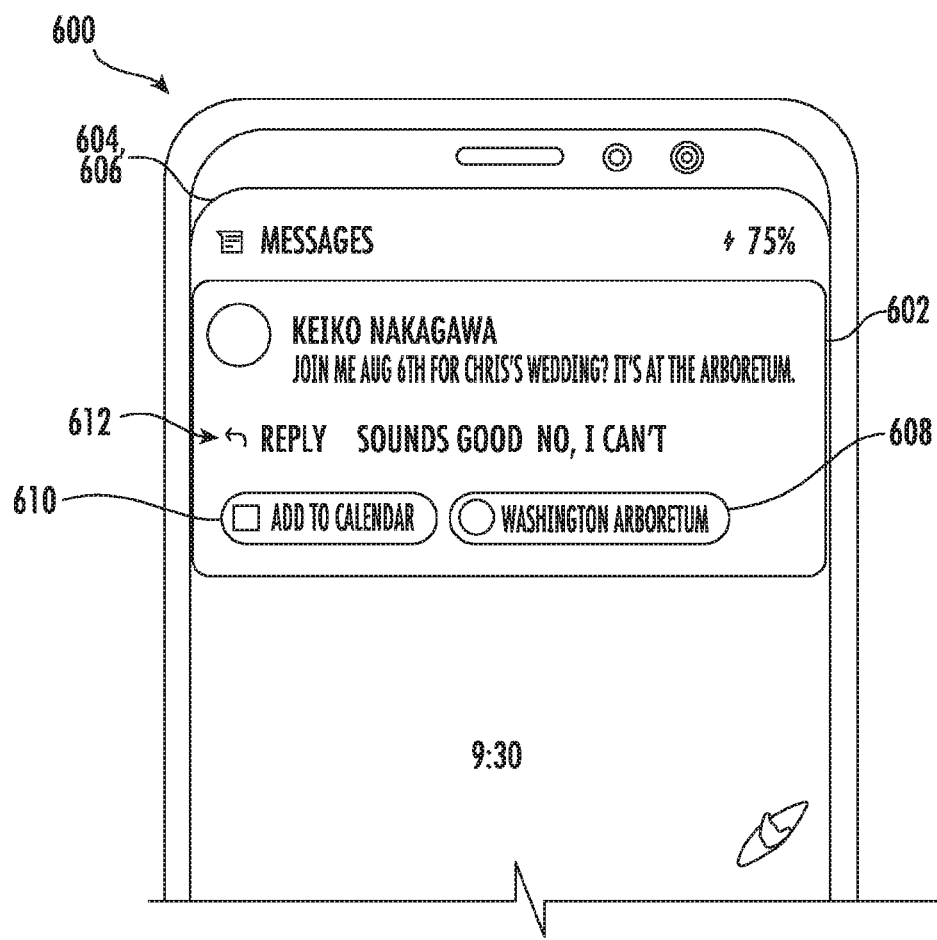
FIG. 6 depicts an example mobile computing device displaying a text message notification in a user interface and indicators of available actions from multiple computer applications with respect to recognized text from the text message according to aspects of the present disclosure.

FIG. 6 depicts an example mobile computing device 600 displaying a text message notification 602 in a user interface 604 and indicators of available actions from multiple computer applications with respect to recognized text from the text message according to aspects of the present disclosure. More specifically, the mobile computing device 600 can display the text message notification in a lock screen 606 displayed in the user interface 604.

In this example, the context data may include the text of the received text message and/or the name of the sender. The semantic entities may include one or more of the following: a date ("Aug $6^{th}$"), an event ("Chris's wedding"), or a venue ("Arboretum") that is described by the context data.

The mobile computing device 600 can be configured to provide data that describes the semantic entity or entities to the computer application(s). In this example the data may include the semantic entity or entities. The mobile computing device 400 can provide the data according to a pre-defined API or other protocol(s).

The mobile computing device 600 can be configured to receive one or more application outputs from the computer applications. The computer applications can format, transmit, and/or alert the computing system about the application output(s) according to rules or protocols (e.g., as specified by the pre-defined API). In this example, the application outputs can include information about an available action that includes navigating to the Arboretum from a navigation application and/or information about an available action that includes creating a calendar event from a calendar application.

The mobile computing device 600 can be configured to provide an indicator 608 that describes the available action that includes navigating to the Arboretum using the navigation application and/or an indicator 610 that describes creating the calendar event from the calendar application.

The mobile computing device 600 can display one or more indicators 612 that include suggested responses. For example, the intelligence system can analyze the context data and generate the suggested responses. Alternatively, the mobile computing device 600 can receive the indicators 612 that include suggested responses from a computer application that is separate from the intelligence system, for example as described above with regard to other indicates 608, 610.

FIG. 7A depicts an example mobile computing device 700 in a first state in which ambient audio mentioning a historical figure is detected and an indicator 702 is displayed in a lock screen 702 displayed in a user interface 704 of the mobile computing device 700 according to aspects of the present disclosure. For example, the mobile computing device 700 may be configured to detect ambient audio (represented by audio symbol 706) using a microphone.

The mobile computing device 700 can be configured to input model input including context data into a recognition machine-learned model, for example as described with reference to FIG. 2A. In this example, the context data can include some or all of the detected ambient audio.

The mobile computing device 700 can be configured to receive model output that describes one or more semantic entities referenced by the context data. In this example, the model output can include the name of a historical figure, Enrico Fermi, and/or additional information about the historical figure of about the sentence or context in which the name of the historical figure was mentioned. For instance, if the name of the historical figure was spoken in a question, such as "Which books did Enrico Fermi write?" or "Who was Enrico Fermi?" the model output can describe additional information about the question or include additional semantic entities from the question (e.g., "books").

The mobile computing device 700 can be configured to provide data descriptive of the semantic entity to one or more computer applications. In this example, the data can include the name "Enrico Fermi" and/or "books." The mobile computing device 700 can provide the data to several computer applications, including searching applications, shopping applications, and/or other suitable applications. The mobile computing device 400 can provide the data according to a pre-defined API or other protocol(s).

The mobile computing device 700 can be configured to receive application outputs respectively from the computing applications in response to the providing the data descriptive of the semantic entity to the computer applications. The computer applications can format, transmit, and/or alert the computing system about the application output(s) according to rules or protocols (e.g., as specified by the pre-defined API). The application output received from each computer application can describe one or more available actions of the corresponding computer application with respect to the semantic entity. In this example, the application output includes output from a searching application and a shopping application, "Amazon." The application output from the searching application output can include relevant information with respect to the semantic entities, such results from an internet query including the semantic entities. In this example, the application output from the searching application can include text from a Wikipedia article about Enrico Fermi. The application output from the shopping application can include available actions that include purchasing one or more products that are related with the semantic entities. In this example, the application output from the shopping application can include books by or about Enrico Fermi that can be purchased using the shopping application.

FIG. 7B depicts the example mobile computing device 700 of FIG. 7A in a second state in which indicators are displayed that describe available actions with respect to the historical figure mentioned in the ambient audio. More specifically, an indicator 720 can be displayed that describes information received from the searching application. In this example, the indicator 720 includes text from a web query performed with respect to the historical figure.

An indicator 722 can be displayed that includes available actions that can be performed by the shopping application with respect to the semantic entities. More specifically, items 724 that are related to the semantic entity can be offered for sale. In this example, the items 724 can include books written by or about the historical figure and/or written about a subject (e.g., physics) that is related to the historical figure.

In some implementations, the mobile computing device 700 can be configured to store information, such as a "bookmark," that includes or describes the indicators 720, 722 for later viewing by the user. For example, the mobile computing device 700 can display a bookmark icon 726. In response to user input that requests storing of one or more of the indicators 720, 722 for later viewing (e.g., a user touch action directed to the bookmark icon 726), the mobile computing device 700 can store information describing the indicator(s) 720, 722 for later viewing and/or display a "saved for later" panel, for example as described below with reference to FIG. 7C.

FIG. 7C depicts the example mobile computing device 700 of FIG. 7A in a third state in which indicators have been "bookmarked" for later viewing, according to aspects of the present disclosure. The mobile computing device 700 can display saved indicators 740 in a "saved for later" panel 742 that can be retrieved when the user wishes to re-visit previously provided indicators 740. In some implementations, saved indicators 740 can be grouped together and/or saved, for example, based on context data associated with the production and/or display of the indicators 740. In this example, the multiple saved indicators 740 can be grouped together as being related to a specific person (e.g., a contact). Additional examples, include saving or grouping indicators based on a type of the available actions and/or computer applications associated with the indicators, a location of the mobile computing device at the time the indicator was provided to the user, a location of the focus of the available action (e.g., a city in which available lodging listing are located, a destination city to which plane tickets were offered), and/or a temporal grouping based on a date or ranges of date (e.g., indicators could be grouped together for a specific vacation or trip).

Figure 8A:
FIG. 8A depicts an example mobile computing device in a first state in which a video and an indicator is displayed in a user interface of the mobile device according to aspects of the present disclosure.

FIG. 8A depicts an example mobile computing device 800 in a first state in which a video 802 and an indicator 804 is displayed in a user interface 806 of the mobile computing device 800 according to aspects of the present disclosure. In this example, the video 802 can be or include a movie trailer, a movie review, or other portion of a movie. The mobile computing device 800 can input model input into a recognition model. The model input can include one or more frames of the video 802 and/or a portion of audio from the video 802, for example as described above with reference to FIG. 2A. The recognition model can output model output that describes one or more semantic entities. For example, the semantic entities could include words spoken in the movie. In some implementations, the recognition model can be configured to identify the movie title, and the semantic entities can include the movie title.

The mobile computing device 800 can be configured to provide data descriptive of the semantic entity to one or more computer applications. In this example, the data can include the title of the movie and/or words spoken in the movie. The mobile computing device 800 can provide the data to several computer applications, including a searching application, a navigation application, an application for viewing movie times, and/or an application for purchasing movie tickets. The mobile computing device 800 can provide the data according to a pre-defined API or other protocol(s).

The mobile computing device 800 can be configured to receive application outputs respectively from the computing applications in response to providing the data descriptive of the semantic entity to the computer applications. The computer applications can format, transmit, and/or alert the computing system about the application output(s) according to rules or protocols (e.g., as specified by the pre-defined API). The application output received from each computer application can describe one or more available actions of the corresponding computer application with respect to the semantic entity or entities. In this example, the application output can include output from the searching application, the navigation application, the application for viewing movie times, and/or the application for purchasing movie tickets. The application output can describe available actions that can be performed with each computer application with respect to the movie.

The indicator 804 can describe an available action that includes searching for information about the movie and/or viewing additional indicators, for example as described below with reference to FIG. 8B. The mobile computing device 800 can be configured to provide the additional indicators for display in response to a user input that is directed to the indicator 804. Thus, in some implementations, the mobile computing device 800 can be configured to provide an indicator 804 that shows that actions are available. The user can then decide whether to view the additional indicators, for example as described below with reference to FIG. 8B.

Figure 8B:
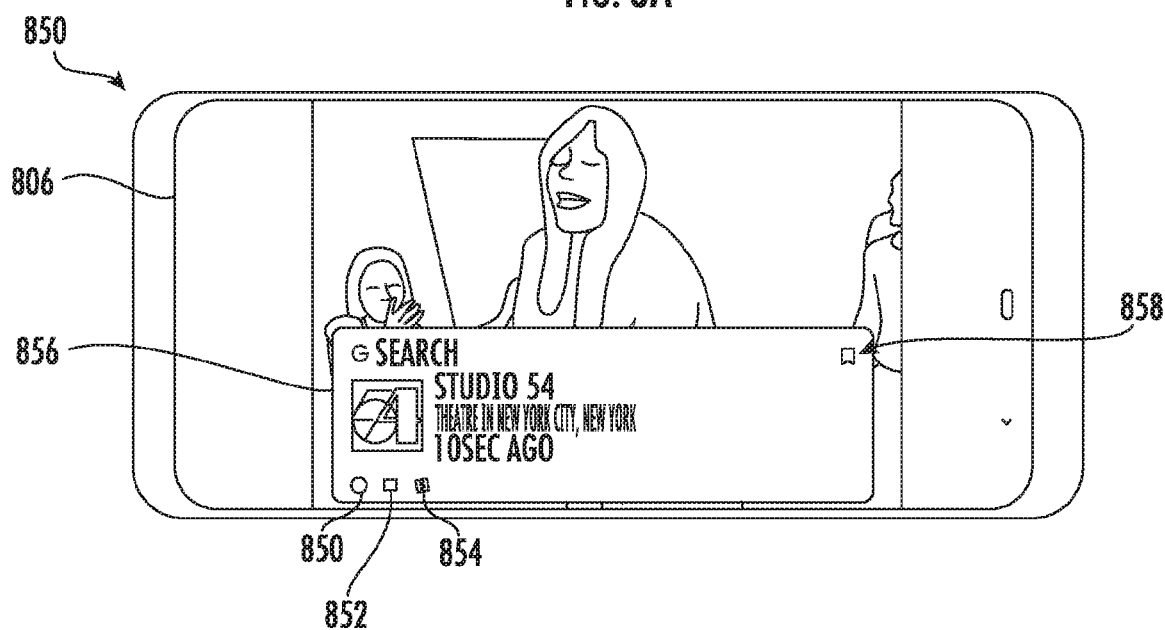
FIG. 8B depicts an example mobile computing device in a second state in which additional indicators are displayed in the user interface that describe available actions associated with the movie, such as purchasing movie tickets according to aspects of the present disclosure.

FIG. 8B depicts the example mobile computing device 800 of FIG. 8A in a second state in which additional indicators 850, 852, 854 are displayed in the user interface 806. The additional indicators 850, 852, 854 can available actions associated with the movie, such as purchasing movie tickets. The additional indicators 850, 852, 854 can be displayed in a panel 856. A common feature of the available actions, such as a movie theater name, can be displayed in the panel 856. The additional indicators 850, 852, 854 can describe available actions with respect to the movie. A first indicator 850 can describe an available action that includes navigating to the movie theater. A second indicator 852 can describe an available action that includes viewing show times of the movie at the movie theater. A third indicator 854 can describe an available action that includes purchasing movie tickets (e.g., at the listed movie theater for the portion of the movie being viewed in the user interface 806). The mobile computing device 800 can display a bookmark icon 858, for example as described above with reference to FIG. 7B.

Figure 9A:
FIG. 9A depicts an example mobile computing device in a first state in which a video and an indicator is displayed in a user interface according to aspects of the present disclosure.

FIG. 9A depicts an example mobile computing device 900 in a first state in which a video 902 and an indicator 904 is displayed in a user interface according to aspects of the present disclosure. The mobile computing device 900 can input model input into a recognition model. The model input can include one or more frames of the video 902 and/or a portion of audio from the video 902, for example as described above with reference to FIG. 2A. The recognition model can output model output that describes one or more semantic entities. For example, the semantic entities could include words spoken in the video or words from a song played in the video. In some implementations, the recognition model can be configured to identify a title of the song played in the video.

The indicator 904 can describe an available action that includes listening to a song that was played in the video. For example, the indicator 904 can include a logo of a music playing application. The mobile computing device 900 can be configured to play the song using the music playing application in response to a user touch action that is directed at the indicator 904. The mobile computing device 900 can also be configured to provide additional indicators for display in response to such a user input, for example as described below with reference to FIG. 9B.

Figure 9B:
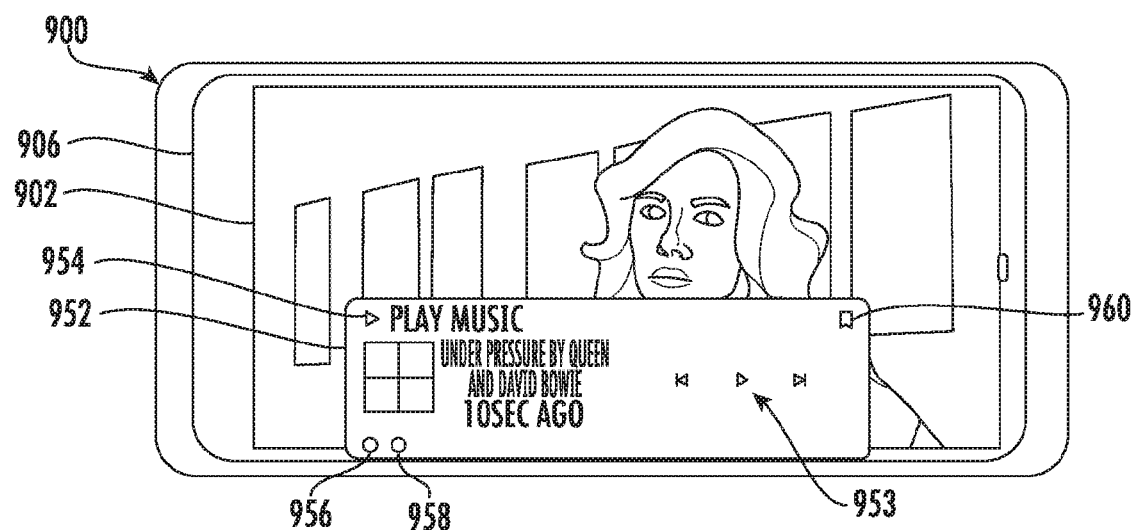
FIG. 9B depicts the example mobile computing device of FIG. 9A in a second state in which the available action associated with the indicator of FIG. 9A is being performed.

FIG. 9B depicts the example mobile computing device 900 of FIG. 9A in a second state in which the available action associated with the indicator 904 of FIG. 9A is being performed. More specifically, the music playing application can play the song identified in the video. A panel 952 can be displayed, and the application performing the requested action (e.g., playing the song) can display information about the action (e.g., the title of the song, an album cover of an album on which the song appeared) and/or provide controls 953 for the user to control the requested action.

Additional indicators 956, 958 can be displayed (e.g., in the panel 952). The additional indicators 956, 958 can describe additional available actions with respect to the song. For example, the additional indicators 956, 958 can describe listening to the song in one or more additional music playing or streaming applications. The mobile computing device 900 can display a bookmark icon 960, for example as described above with reference to FIG. 7B.

Figure 10C:
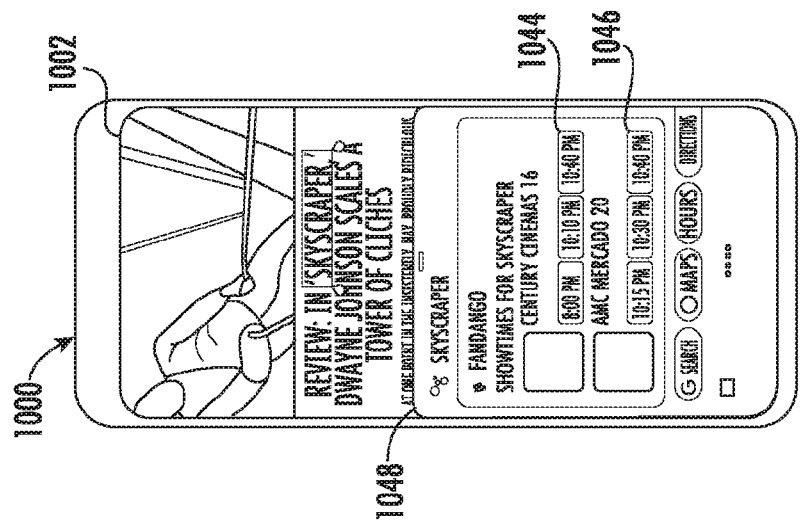
FIG. 10C depicts the example mobile computing device of FIG. 10A in a third state in which indicators are displayed describing further available actions with respect to the movie title according to aspects of the present disclosure.
Figure 10B:
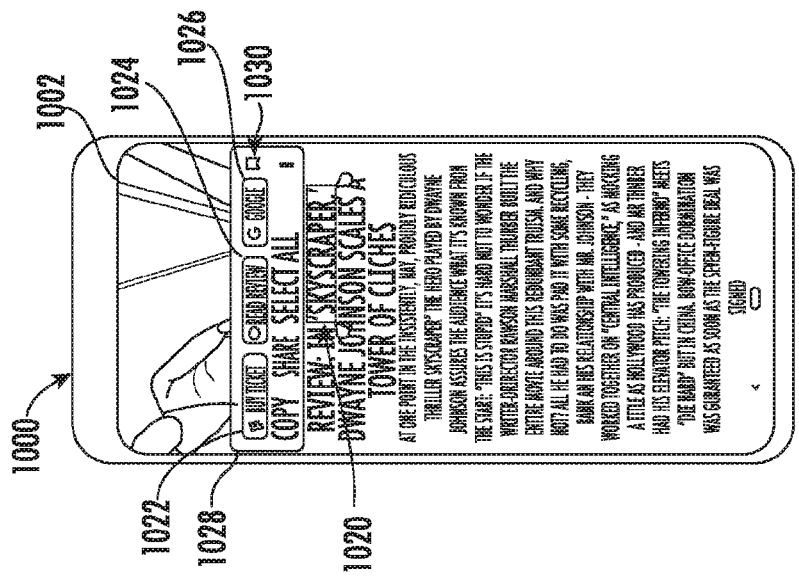
FIG. 10B depicts the example mobile computing device of FIG. 10A in a second state in which a movie title is highlighted in the text and indicators are displayed describing available actions with respect to the movie title according to aspects of the present disclosure.
Figure 10A:
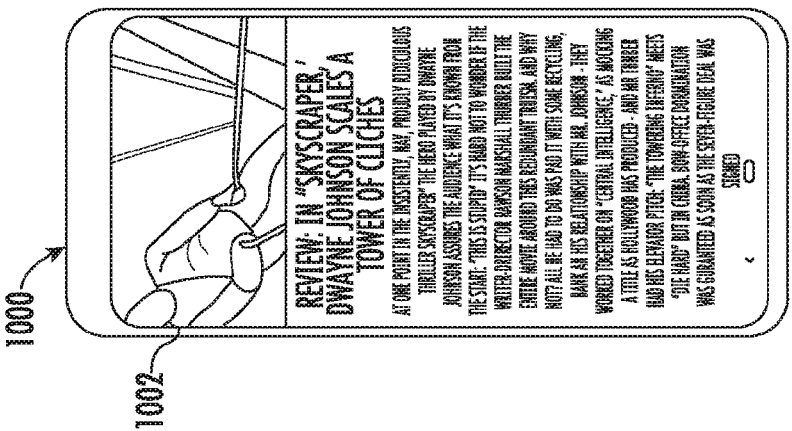
FIG. 10A depicts an example mobile computing device in which text is displayed in a user interface of the mobile computing device according to aspects of the present disclosure.

FIG. 10A depicts an example mobile computing device 1000 in which text is displayed in a user interface 1002 of the mobile computing device 1000 according to aspects of the present disclosure. More specifically, an article reviewing a movie is displayed in the user interface 1002.

FIG. 10B depicts the example mobile computing device 1000 of FIG. 10A in a second state in which a movie title 1020 is highlighted in the text. Indicators 1022, 1024, 1026 are displayed in that describe available actions with respect to the movie title 1020 according to aspects of the present disclosure. More specifically, the mobile computing device 1000 can be configured to display the indicators 1022, 1024, 1026 in response to the user highlighting the movie title 1020. In some implementations, the mobile computing device 1000 may be configured to input the model input into the recognition model, for example as described with reference to FIG. 2A, in response to the user highlighting the movie title 1020.

The mobile computing device 1000 can be configured to input model input into the recognition model that includes some or all of the text displayed in the user interface 1002. For example, the model input can include the movie title 1020 and/or additional text and/or images displayed in the user interface 1002. The recognition model can output model output that describes one or more semantic entities described by the model input. For example, the semantic entities could include the title of the movie and/or a type or category of the semantic input (e.g., the model output can describe or recognize that the model input includes a movie title).

The mobile computing device 1000 can be configured to provide data descriptive of the semantic entity to one or more computer applications. In this example, the data can include the title of the movie and/or the type or category of semantic entity (e.g., movie title). The mobile computing device 1000 can provide the data to one or more computer applications that include a movie ticket purchasing application, a movie reviewing application, and/or a searching application. The mobile computing device 1000 can provide the data according to a pre-defined API or other protocol(s).

The mobile computing device 1000 can be configured to receive application outputs respectively from the computing applications in response to providing the data descriptive of the semantic entity to the computer applications. The computer applications can format, transmit, and/or alert the computing system about the application output(s) according to rules or protocols (e.g., as specified by the pre-defined API). The application output received from each computer application can describe one or more available actions of the corresponding computer application with respect to the semantic entity or entities. In this example, the application output can include output from the movie ticket purchasing application, a movie reviewing application, and/or a searching application. The application output can describe available actions that can be performed with each computer application with respect to the movie.

The mobile computing device 1000 can display the indicators 1022, 1024, 1026 in the user interface 1002. The indicators 1022, 1024, 1026 can describe available actions that can include purchasing a movie ticket using the movie ticket purchasing application, viewing a movie review using the movie reviewing application, and/or performing a web search using the searching application. The indicators 1022, 1024, 1026 can be displayed in a panel 1028 in the user interface. A bookmark icon 1030 can be displayed in the panel 1028 that is configured to save the indicators 1022, 1024, 1026 for later, for example as described above with reference to FIG. 7B.

FIG. 10C depicts the example mobile computing device 1000 of FIG. 10A in a third state in which additional indicators 1044, 1046 are displayed describing further available actions with respect to the movie title according to aspects of the present disclosure. The mobile computing device 1000 can be configured to display the additional indicators 1044, 1046 in response to detecting a user input directed to one or more of the indicators 1022, 1024, 1026 of FIG. 10B. The additional indicators 1044, 1046 can be displayed in a panel 1048 (e.g., a half-panel) that can be displayed in a lower region of the user interface 1002. The additional indicators 1044, 1046 can describe the available action of purchasing movie tickets (e.g., at specific times and/or at specific theater).

Figure 11B:
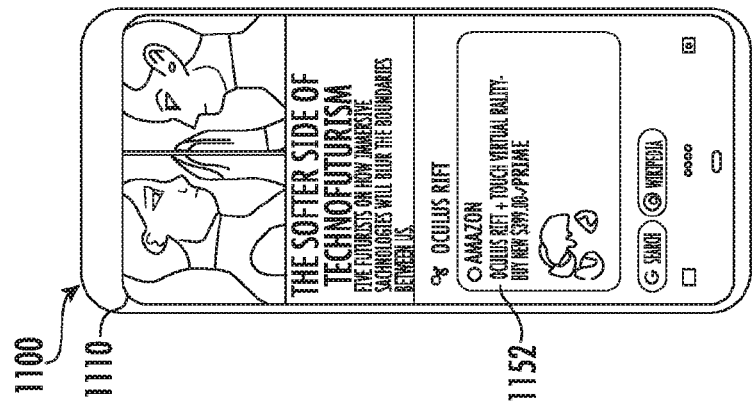
FIG. 11B depicts the example mobile computing device 1100 of FIG. 11A in a second state in which an indicator is displayed providing additional information about a selected action described by one of the indicators of FIG. 11A, according to aspects of the present disclosure.
Figure 11A:
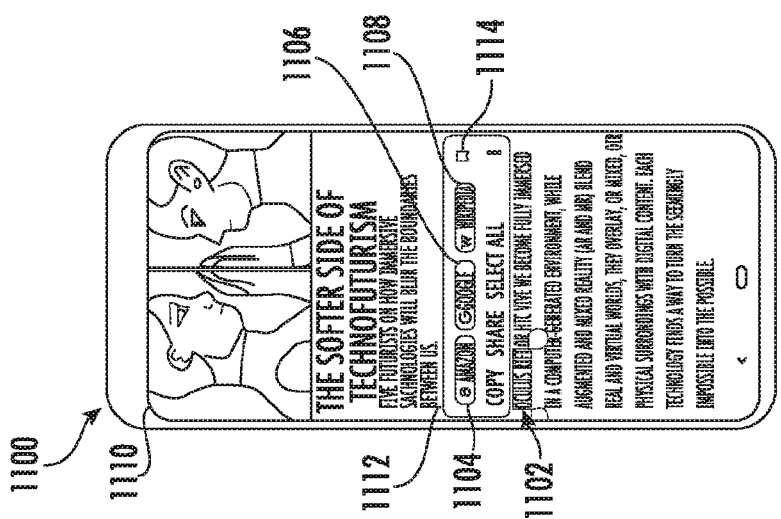
FIG. 11A depicts an example mobile computing device in a first state in which text has been highlighted and indicators are displayed in a user interface of the mobile computing device according to aspects of the present disclosure.

FIG. 11A depicts an example mobile computing device 1100 in a first state in which text 1102 has been highlighted, and indicators 1104, 1106, 1108 are displayed in a user interface 1110 (e.g., in a panel or tile 1112 displayed in the user interface 1110) of the mobile computing device 1100 according to aspects of the present disclosure. In this example, the user has highlighted a name of a product, "Oculus Rift." One indicator 1104 describes an available action from a shopping application, Amazon. Another indicator 1106 describes an available action form a searching application. Yet another indicator 1108 describes an available action that includes viewing a web page from Wikipedia that includes additional information about the Oculus Rift. A bookmark icon 1114 can be displayed in the panel 1112 that is configured to save the indicators 1104, 1106, 1108 for later, for example as described above with reference to FIG. 7B.

FIG. 11B depicts the example mobile computing device 1100 of FIG. 11A in a second state in which information is displayed about a selected action according to aspects of the present disclosure. More specifically, in response to a user input directed to the indicator 1104 describing the available action from the shopping application, the mobile computing device 1100 can display an indicator 1152 that provides additional information about the selected available action. In this example, the indicator 1152 can include information about the highlighted product 1102, such as purchase price and shipping option. The mobile computing device 1100 can be configured to purchase the product in response to a user input action directed to the indicator 1152.

Figure 12C:
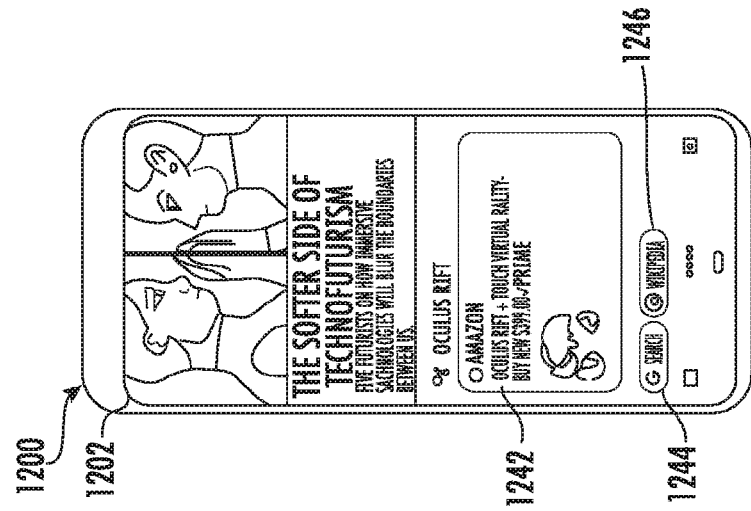
FIG. 12C depicts the example mobile computing device of FIG. 12A in a third state in which additional information is displayed about a selected indicator of FIG. 12A as well as additional indicators displayed describing further available actions according to aspects of the present disclosure.
Figure 12B:
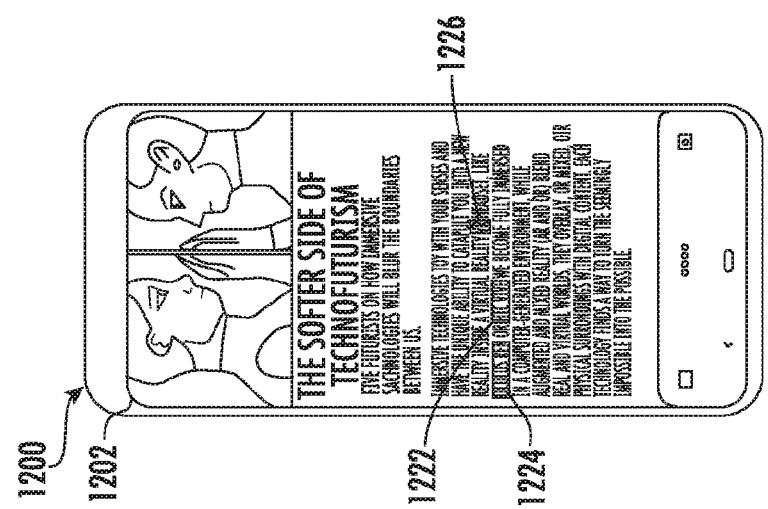
FIG. 12B depicts the example mobile computing device of FIG. 12A in a second state in which indicators are displayed describing available actions with respect to portions of the text according to aspects of the present disclosure.
Figure 12A:
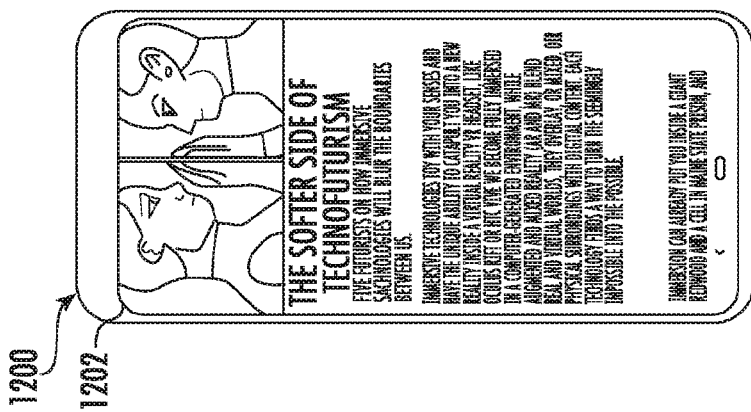
FIG. 12A depicts an example mobile computing device in which text is displayed in a user interface of the mobile computing device according to aspects of the present disclosure.

FIG. 12A depicts an example mobile computing device 1200 in which text is displayed in a user interface 1202 of the mobile computing device 1200 according to aspects of the present disclosure. More specifically, an article may be displayed in the user interface 1200.

The mobile computing device 1200 can be configured to input model input into the recognition model that includes some or all of the text of the article displayed in the user interface 1202, for example as described above with reference to FIG. 2A. The recognition model can output model output that describes one or more semantic entities described by the model input. For example, the semantic entities can include the names of products, technologies, historical figures, and/or other entities of interest mentioned in the article. In this example, the model output can include the names of products, such as Oculus Rift and HTC Vibe. The model output can include the name of a technology, such as virtual reality (VR).

The mobile computing device 1200 can be configured to provide data descriptive of the semantic entities to one or more computer applications. In this example, the data can include the names of the products and/or technologies mentioned in the article. The mobile computing device 1200 can provide the data to one or more computer applications, for example, including a shopping application and/or other suitable computer applications. The mobile computing device 1200 can provide the data according to a pre-defined API or other protocol(s).

The mobile computing device 1200 can be configured to receive application outputs respectively from the computing applications in response to providing the data descriptive of the semantic entity to the computer applications. The computer applications can format, transmit, and/or alert the computing system about the application output(s) according to rules or protocols (e.g., as specified by the pre-defined API). The application output(s) received from each computer application can describe one or more available actions of the corresponding computer application with respect to the semantic entity or entities. In this example, the application output can include output from the shopping application.

FIG. 12B depicts the example mobile computing device 1200 of FIG. 12A in a second state in which indicators 1222, 1224, 1226 are displayed describing available actions with respect to portions of the text according to aspects of the present disclosure. More specifically, in this example, the indicators 1222, 1224, 1226 can include the respective semantic entities displayed with outlining, highlighting, or an otherwise altered appearance (e.g., a font, size, color, etc.). The indicators 122, 1224, 1226 can alert the user that actions are available with respect to the semantic entities.

FIG. 12C depicts the example mobile computing device 1200 of FIG. 12A in a third state in which additional information is displayed about a selected indicator of FIG. 12A as well as additional indicators displayed describing further available actions according to aspects of the present disclosure. More specifically, in response to a user touch action directed to the indicator 1224 including the text "Oculus Rift," the mobile computing device 1200 can be configured to display additional information 1242 about the available action described by the indicator 1224. In this example, the additional information 1242 can include price, shipping options, etc., associated with purchasing the Oculus Rift system with the shopping application.

The mobile computing device 1200 can also display additional indicators 1244, 1246 describing additional available actions. In this example, the one additional indicator 1244 describes performing a web search with respect to the semantic entity, "Oculus Rift." The other additional indicator 1246 describes an available action that includes viewing a web page (e.g., on Wikipedia) that provides additional information about the semantic entity.

Figure 13C:
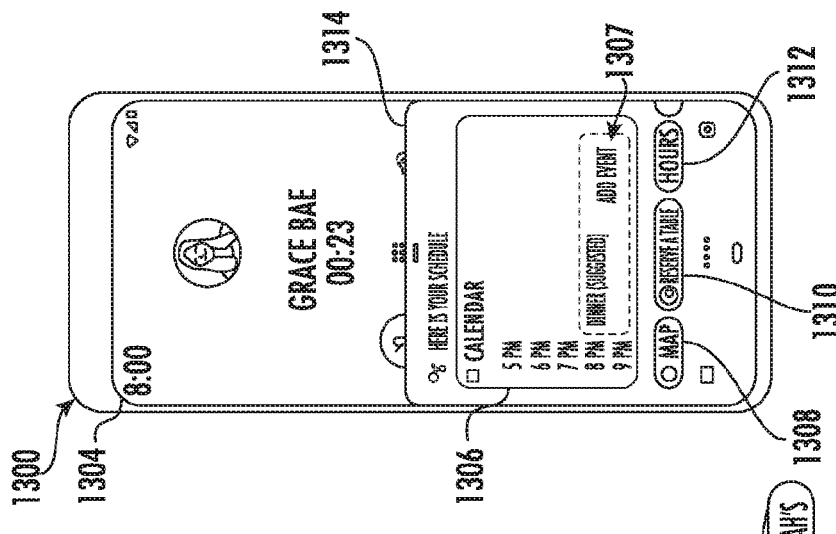
FIG. 13C depicts the example mobile computing device of FIG. 13A in a third state in which indicators are displayed describing further available actions with respect to semantic entities gleamed from the audio of the phone call according to aspects of the present disclosure.
Figure 13B:
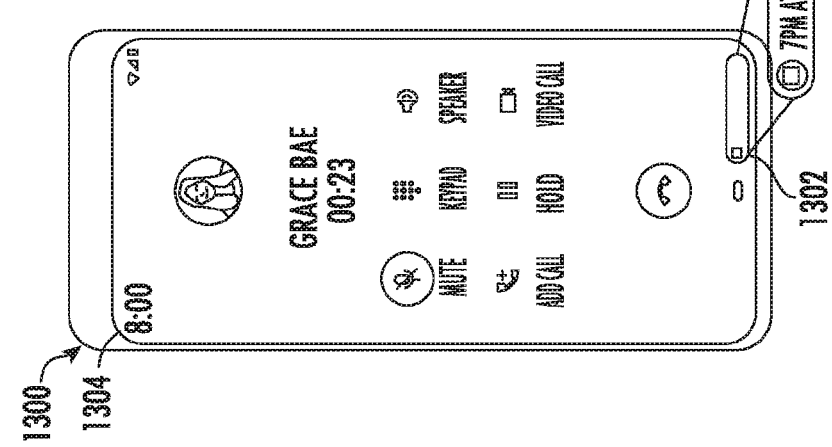
FIG. 13B depicts the example mobile computing device of FIG. 13A in a second state in which an indicator is displayed describing available actions with respect to semantic entities gleamed from the audio of the phone call according to aspects of the present disclosure.
Figure 13A:
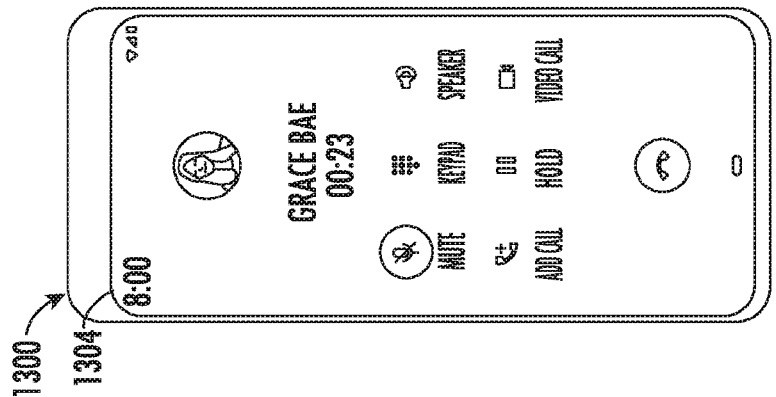
FIG. 13A depicts an example mobile computing device in a first state in which the mobile computing device is processing audio during a phone call according to aspects of the present disclosure.

FIG. 13A depicts an example mobile computing device 1300 that is processing audio during a phone call according to aspects of the present disclosure. The mobile computing device 1300 can be configured to input model input into a machine-learned model (e.g., the recognition model described above with reference to FIG. 2A) that includes some or all of the audio processed during the phone call. Importantly, the user can be provided with controls allowing the user to make an election as to both if and when systems, programs, or features described herein may enable such collection of information.

FIG. 13B depicts the example mobile computing device 1300 of FIG. 13A in a second state in which an indicator 1302 is displayed in a user interface 1304 that describes available actions with respect to semantic entities recognized or identified in the audio of the phone call according to aspects of the present disclosure. For instance, if the user mentions, "dinner at Tullulah's at 7 pm," the mobile computing device 1300 can provide one or more indicator(s) associated with eating dinner at the restaurant mentioned in the phone call.

The mobile computing device 1300 can be configured to provide data descriptive of the semantic entity to one or more computer applications. In this example, the data can include one or more semantic entities described by the model output and recognized in the audio of the phone call. The mobile computing device 1300 can provide the data to several computer applications, including a calendar application, a restaurant reservation application and/or additional applications (e.g., searching application, a navigation application, an application for viewing movie times, and/or an application for purchasing movie tickets). The mobile computing device 1300 can provide the data according to a pre-defined API or other protocol(s).

Importantly, the user can be provided with controls allowing the user to make an election as to both if and when systems, programs, or features described herein may enable collection of user information, as indicated above. Additionally, in some implementations, potentially sensitive or personal information can remain on-device and/or a notification or signal can be provided to the user when such information is transmitted from the device 1300 (e.g., to a server computing system for processing).

The mobile computing device 1300 can be configured to receive application outputs respectively from the computing application(s) in response to providing the data descriptive of the semantic entity to the computer applications. The computer applications can format, transmit, and/or alert the computing system about the application output(s) according to rules or protocols (e.g., as specified by the pre-defined API). The application output received from each computer application can describe one or more available actions of the corresponding computer application with respect to the semantic entity or entities. The application output can describe available actions that can be performed. In this example, the application output(s) can include output from the calendar application, the restaurant reservation application, and/or other computer applications.

The mobile computing device 1300 can be configured to display the indicator 1302 in the user interface 1304. In this example, the indicator 1302 can describe an available action that includes creating a calendar event corresponding to an event mentioned in the audio of the phone conversation.

FIG. 13C depicts the example mobile computing device 1300 of FIG. 13A in a third state in which information 1306 is displayed about a selected available action. More specifically, in response to a user input action directed to the indicator 1302, the mobile computing device 1300 can be configured to display the information 1306 about available action(s). In this example, the information 1306 can include a suggested calendar event that the user can confirm (e.g., by performing a user input directed to "add event" 1307).

The mobile computing device 1300 can display additional indicators 1308, 1310, 1312 describing further available actions with respect to semantic entities detected from the audio of the phone call according to aspects of the present disclosure. In this example, the additional indicators 1308, 1310, 1312 can describe available actions that include navigating to the restaurant mentioned in the phone call, making a reservation at the restaurant mentioned in the phone call, viewing the hours of the restaurant, etc. using respective computer applications.

Figure 14C:
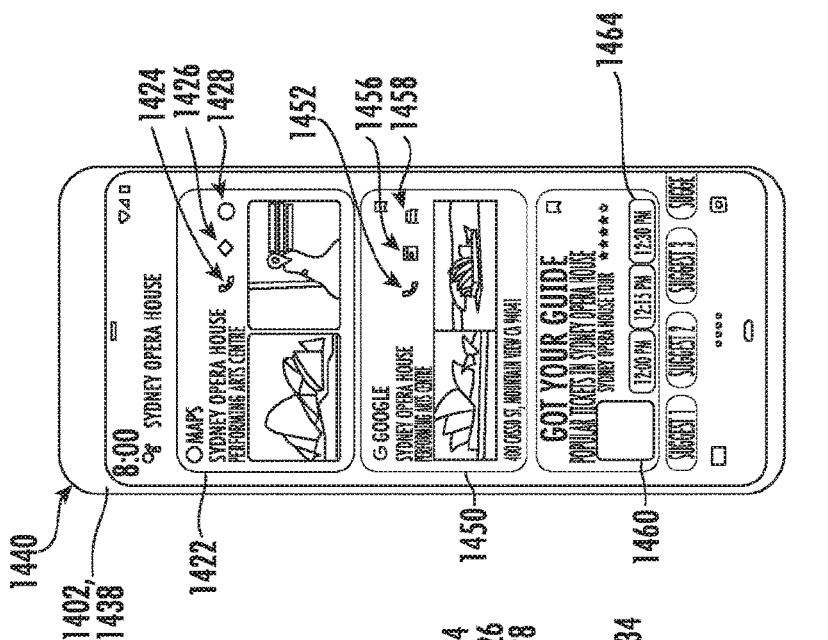
FIG. 14C depicts the example mobile computing device of FIG. 14A in a third state in which indicators are displayed describing further available actions with respect to the landmark depicted in the image from the camera according to aspects of the present disclosure.
Figure 14B:
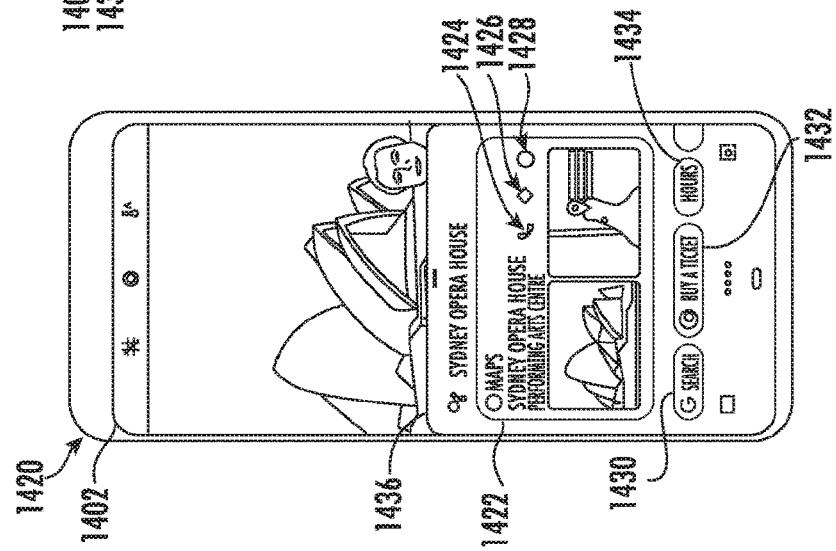
FIG. 14B depicts the example mobile computing device of FIG. 14A in a second state in which indicators are displayed describing available actions with respect to a landmark depicted in the image from the camera according to aspects of the present disclosure.
Figure 14A:
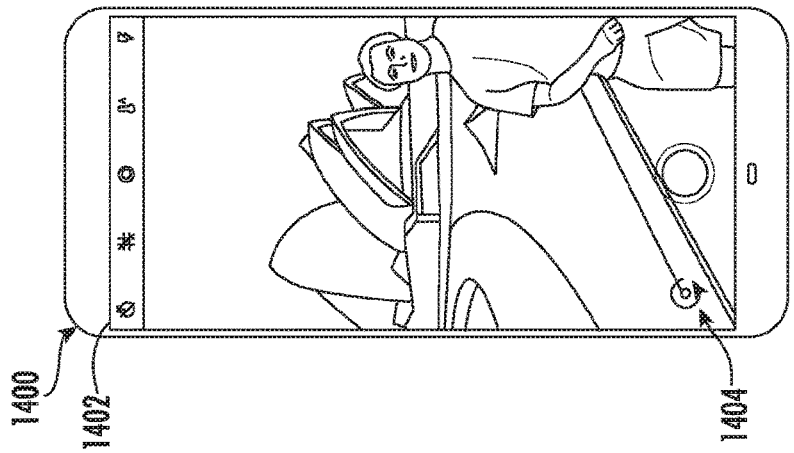
FIG. 14A depicts an example mobile computing device in a camera mode in which an image from a camera of the mobile computing device is displayed in the user interface of the mobile computing device according to aspects of the present disclosure.

FIG. 14A depicts an example mobile computing device 1400 in a camera mode in which an image from a camera of the mobile computing device 1400 is displayed in a user interface 1402 of the mobile computing device 1400 according to aspects of the present disclosure. The mobile computing device 1400 can recognize one or more entities depicted in the user interface 1402 (e.g., using a machine-learned model as described above with reference to FIG. 2A). The mobile computing device 1400 can be configured to provide data descriptive of the one or more semantic entities to one or more computer applications and/or receive application output(s) from the computer application(s), for example as described above with reference to FIGS. 4 through 13C.

FIG. 14B depicts the example mobile computing device 1400 of FIG. 14A in a second state in which additional information 1422 is displayed about the entity depicted in the user interface of FIG. 14A. For example, the mobile computing device 1400 can be configured to provide information 1422 about the available action(s) in response to user input directed to the indicator 1404 of FIG. 14A. In this example, the information 1422 can include a name of the landmark, a description of the landmark, and/or a location of the landmark on the map. The information can be provided by a navigation application. The mobile computing device 1400 can be configured to provide additional indicators 1424, 1426, 1428 describing additional actions that can be performed by the navigation app. In this example, the additional indicators 1424, 1426, 1428 can describe additional actions that can be performed with the navigation application. The mobile computing device 1400 can also be configured to provide additional indicators 1430, 1432, 1423 that describe available actions that can be performed by other applications such as a searching application and/or a reservation application. The information 1422 and/or indicators 1424, 1426, 1428, 1430, 1432, 1434 can be displayed within a panel 1436 (e.g., a half-shelf) in the user interface 1402.

FIG. 14C depicts the example mobile computing device 1400 of FIG. 14A in a third state in which indicators are displayed describing further available actions with respect to the landmark depicted in the image from the camera according to aspects of the present disclosure. More specifically, in some implementations, the mobile computing device 1400 can be configured to display a larger panel or shelf 1438 in response to user input action requesting additional information and/or available actions to those displayed in FIG. 14B. For instance, the user can swipe or drag the panel 1436 of FIG. 14A upward to request that a larger panel 1438 be displayed. The larger panel 1438 can include additional information 1450, 1460 (e.g., form other computer applications) and/or additional indicators 1452, 1456, 1458, 1464 describing additional available action(s) (e.g., from other computer applications). For instance, the additional indicators 1464 can include purchasing tickets for a tour or other event at the landmark depicted in the user interface 1402 of FIGS. 14A and 14B.

FIG. 15A depicts an example mobile computing device 1500 in which text is displayed in a user interface 1502 of the mobile computing device according to aspects of the present disclosure. The text can include an article in one language. The mobile computing device 1500 may be configured to display an indicator 1504 that describes an available action that includes translating some or all of the text into another language.

FIG. 15B depicts the example mobile computing device 1500 of FIG. 15A in a second state in which indicators are displayed describing available actions with respect to portions of the text according to aspects of the present disclosure. The mobile computing device 1500 can be configured to provide indicators 1506, 1508, 1510 that describe available actions that include translating the some or all of the text of the article. For example, the mobile computing device 1500 can be configured to provide the indicators 1506, 1508, 1510 in response to a user highlighting a portion of the text.

FIG. 15C depicts the example mobile computing device 1500 of FIG. 15A in a third state in which the requested action is performed. For example, the translation can be displayed in a panel or shelf 1542.

Figure 16C:
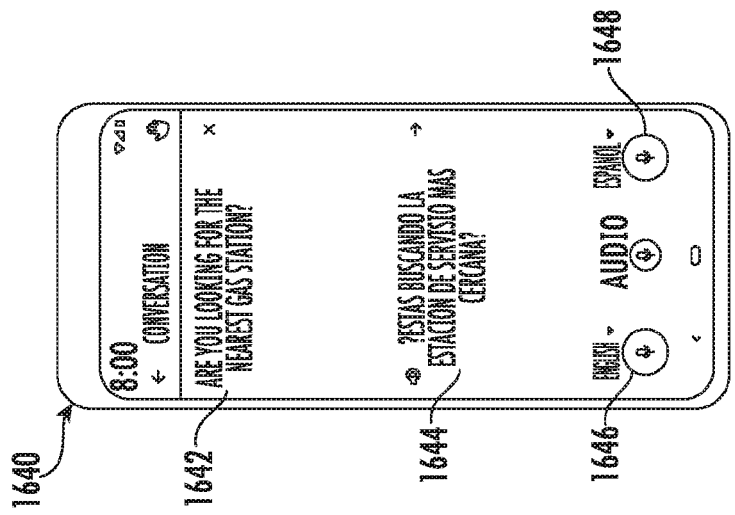
FIG. 16C depicts the example mobile computing device of FIG. 16A in a third state in which indicators are displayed describing further available actions with respect to the translation according to aspects of the present disclosure.
Figure 16B:
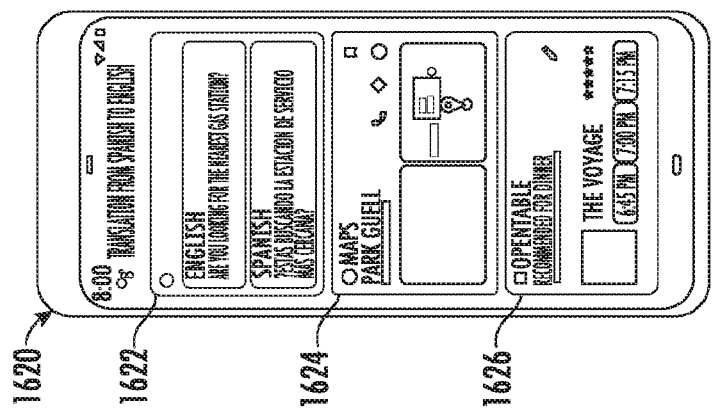
FIG. 16B depicts the example mobile computing device of FIG. 16A in a second state in which indicators are displayed describing available actions with respect to the spoken Spanish.
Figure 16A:
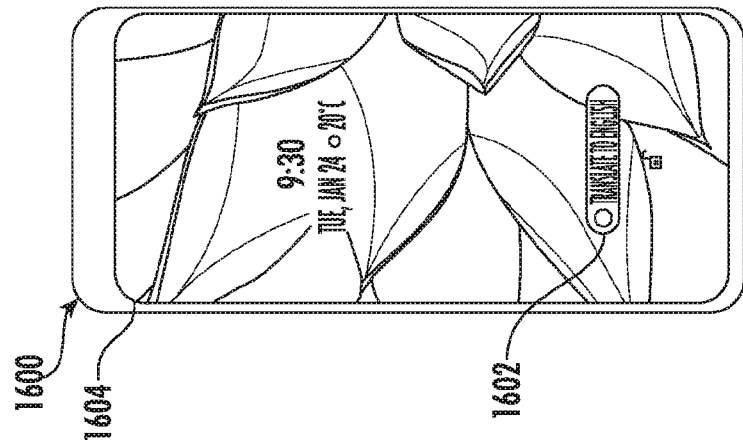
FIG. 16A depicts an example mobile computing device in a first state in which ambient audio of spoken Spanish is detected and an indicator describing an available action that includes translating the spoken Spanish into English is displayed in a lock screen of the mobile computing device according to aspects of the present disclosure.

FIG. 16A depicts an example mobile computing device 1600 in a first state in which ambient audio of spoken Spanish is detected and an indicator 1602 describing an available action that includes translating the spoken Spanish into English is displayed in a lock screen 1604 of the mobile computing device 1600 according to aspects of the present disclosure. The mobile computing device 1600 can detect audio with a microphone and input a model input that includes a recording of the audio into a recognition machine-learned, for example as described above with reference to FIG. 2A.

FIG. 16B depicts the example mobile computing device 1600 of FIG. 16A in a second state in which indicators 1622, 1624, 1626 are displayed describing available actions with respect to the translation and/or entities mentioned in the audio. For example, one indicator 1622 can provide a translation of the spoken Spanish from a translation application. Another indicator 1624 can describe an available action from a navigation application that includes navigating to a location mentioned in the spoken Spanish. A third indicator 1626 can describe an available action from a reservation application that includes making a reservation at a restaurant mentioned in the spoken Spanish, for example at or near a time mentioned in the spoken Spanish.

FIG. 16C depicts the example mobile computing device 1600 of FIG. 16A in a third state in which additional information 1642, 1644 and/or indicators 1646, 1648 are displayed from the translation application. For example, the mobile computing device 1600 may be configured to display the additional information 1642, 1644 and/or indicators 1646, 1648 in response to user input action directed to the indicator 1622 of FIG. 16B.

Figure 17A:
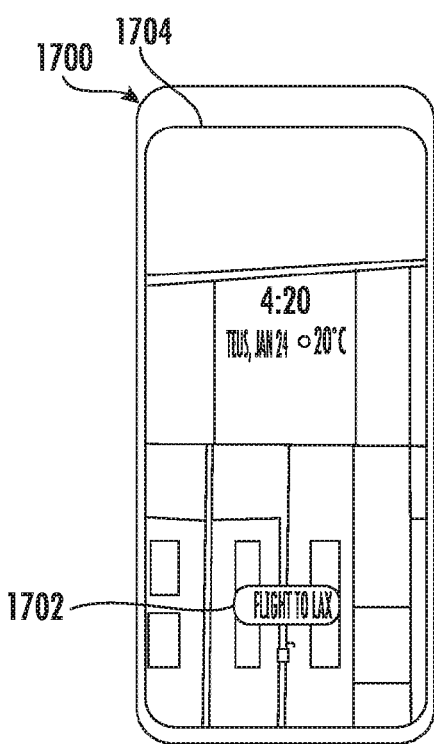
FIG. 17A depicts an example mobile computing device in which an indicator is displayed in a lock screen of the mobile computing device showing available actions based on calendar data, which includes an upcoming flight, according to aspects of the present disclosure.

FIG. 17A depicts an example mobile computing device 1700 in which an indicator 1702 is displayed in a lock screen 1704 of the mobile computing device 1700 showing available actions based on calendar data, which can include an upcoming flight, according to aspects of the present disclosure. The mobile computing device 1700 may be configured to input some or all calendar data stored by the computing system into the recognition machine learned model, for example as described above with reference to FIG. 2A. The mobile computing device 1700 may be configured to receive model output that describes one or more semantic entities described by the model input. For example, the semantic entities could include information about an upcoming flight that the user plans to take.

The mobile computing device 1700 can be configured to provide data descriptive of the semantic entity to one or more computer applications. In this example, the data can include the airport code (e.g., "LAX") of a destination airport, a date of the upcoming flight, and/or a time of the upcoming flight. The mobile computing device 1700 can provide the data to one or more computer applications, for example, including an airline application, a lodging application, an entertainment application, and/or a weather application. The mobile computing device 1700 can provide the data according to a pre-defined API or other protocol(s).

The mobile computing device 1700 can be configured to receive application outputs respectively from the computing applications in response to providing the data descriptive of the semantic entity to the computer applications. The computer applications can format, transmit, and/or alert the computing system about the application output(s) according to rules or protocols (e.g., as specified by the pre-defined API). The application output received from each computer application can describe one or more available actions of the corresponding computer application with respect to the semantic entity or entities. In this example, the application output(s) can include output from the airline application, the lodging application, the entertainment application, and/or the weather application. The application output can describe available actions that can be performed with each computer application with respect to the upcoming flight. The mobile computing device 1700 can display the indicators 1702 in the user interface 1704. The indicator 1702 can alert the user that actions are available from one or more computer applications with respect to the upcoming flight.

Figure 17B:
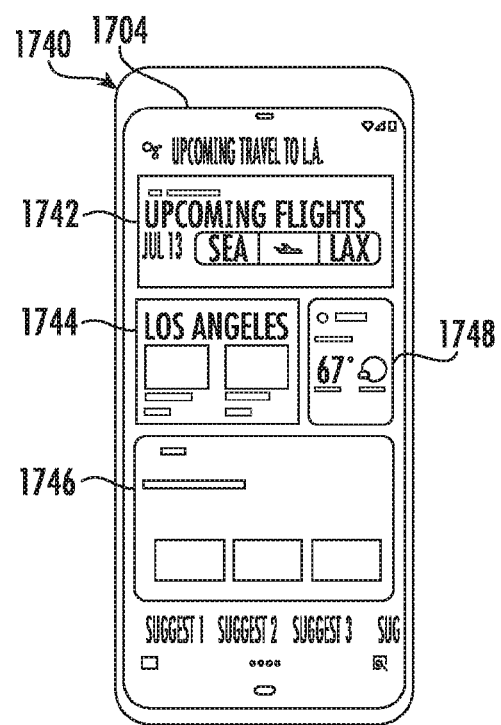
FIG. 17B depicts the example mobile computing device of FIG. 17A in a second state in indicators are displayed describing further available actions with respect to the calendar data according to aspects of the present disclosure.

FIG. 17B depicts the example mobile computing device 1700 of FIG. 17A in a second state, in which indicators 1742, 1744, 1746, 1748 are displayed describing further available actions with respect to the calendar data according to aspects of the present disclosure. For example, one of the indicators 1742 can be displayed that describes an available action that includes viewing information and/or documents associated with the upcoming flight (e.g., flight times, boarding passes, etc.). Another of the indicators 1744 can describe available actions that include viewing or reserving lodging in the destination city of the upcoming flight. Another of the indicators 1746 can describe available actions that include downloading entertainment content (e.g., movies, podcasts, etc.) for viewing during the flight. Another of the indicators 1748 can provide weather forecast information with respect to the destination city and/or dates that the user will be in the destination city.

Figure 18B:
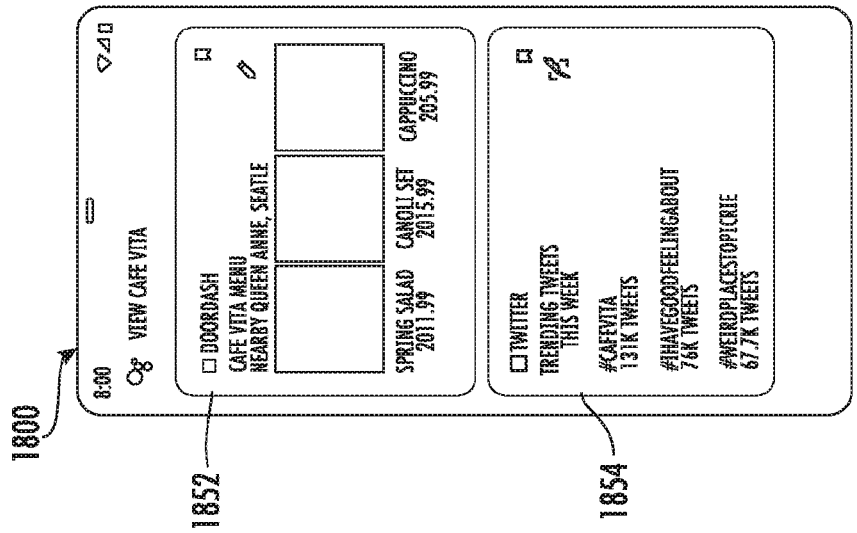
FIG. 18B depicts the example mobile computing device of FIG. 18A in a second state in which indicators are displayed describing further available actions based on the location of the mobile computing device according to aspects of the present disclosure.
Figure 18A:
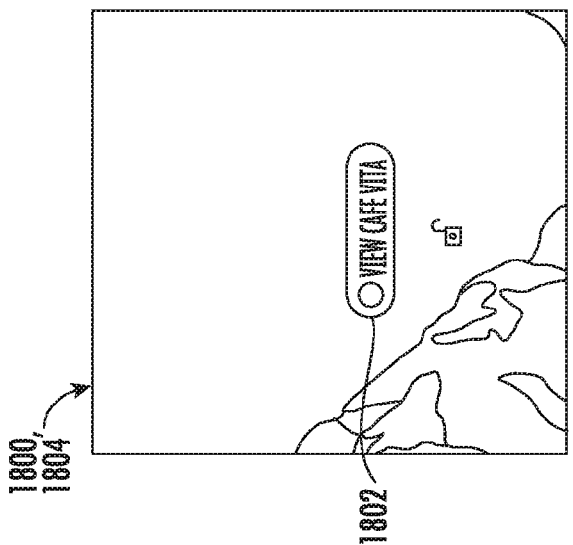
FIG. 18A depicts an example mobile computing device in which an indicator is displayed in a lock screen of the mobile computing device showing available actions based on a location of the mobile computing device according to aspects of the present disclosure.

FIG. 18A depicts a user interface 1800 of an example mobile computing device in which an indicator 1802 is displayed in a lock screen 1804 that is displayed in the user interface 1800. The indicator 1802 can describe available actions based on a location of the mobile computing device according to aspects of the present disclosure. More specifically, the mobile computing device can use the location of the mobile computing device to identify nearby restaurants or other points of interest, for example, based on past user interactions or learned preferences. If the user has previously expressed interest in a specific restaurant or point of interest (e.g., via text message, by viewing an article about the restaurant, by ordering food from the restaurant, dining in the restaurant, etc.), the mobile computing device (e.g., the artificial intelligence system) can identify the restaurant or point of interest when the mobile computing device is nearby.

FIG. 18B depicts the user interface 1800 of FIG. 18A in which indicators 1852, 1854 are displayed that describe available actions with respect to the restaurant described by the indicator 1802 of FIG. 18A. For example, the mobile computing device can be configured to display the indicators 1852, 1854 in response to detecting a user input action directed to the indicator 1802 of FIG. 18A. One indicator 1852 can describe an available action that includes ordering food for delivery from the restaurant. Another indicator 1854 can describe an available action that includes viewing social media with respect to the restaurant.

In some implementations, the indicator could available actions that include navigating to a wheelchair-accessible entrance and/or exit of the restaurant or point of interest. For example, the indicator could inform the user that a navigation application is available to navigate the user to the entrances/exits along a suitably accessible route, such as route suitable for a wheelchair.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A mobile computing device, comprising:
    at least one processor;
    a plurality of computing applications; and
    at least one tangible, non-transitory computer-readable medium that stores instructions that, when executed by the at least one processor, cause the at least one processor to perform operations, the operations comprising:
        proactively performing, without receipt of a user input requesting performance:
            inputting contextual input data into a machine-learned model;
            receiving, as an output of the machine-learned model, a model output that describes one or more semantic entities referenced by the contextual input data;
            selecting a computing application of the plurality of computing applications based at least in part on the model output;
            providing data descriptive of the one or more semantic entities to the computing application; and
            receiving an application output from the computing application of the plurality of computing applications in response to providing the data descriptive of the one or more semantic entities to the computing application, wherein the application output received from the computing application describes an available action of the corresponding computing application with respect to the one or more semantic entities; and performing the available action of the computing application, wherein performing the available action causes display of at least one indicator associated with the available action via a display device associated with the mobile computing device.

2. The mobile computing device of claim 1, wherein the contextual input data comprises at least one of information displayed in a user interface, audio played by the mobile computing device, or ambient audio detected by the mobile computing device.

3. The mobile computing device of claim 1, wherein the contextual input data comprises at least one of calendar data or a location of the mobile computing device.

4. The mobile computing device of claim 1, wherein the mobile computing device comprises, or is communicatively coupled to, an artificial intelligence system that includes the machine-learned model and that performs the operations, wherein the artificial intelligence system is separate and distinct from the plurality of computing applications but capable of communicating with the plurality of computing applications.

5. The mobile computing device of claim 4, wherein the artificial intelligence system provides the model output descriptive of the one or more semantic entities to the computing application and receives the application output from the computing application via a pre-defined application programming interface.

6. The mobile computing device of claim 1, wherein the at least one indicator comprises:
a graphical indicator presented in a user interface; or
an audio indicator played to the user.

7. The mobile computing device of claim 1, wherein performing the available action of the computing application comprises displaying the at least one indicator in at least one of an operating system-level navigation bar in a user interface or a lock screen in the user interface.

8. The mobile computing device of claim 1, wherein selecting the computing application of the plurality of computing applications based at least in part on the model output comprises:
selecting the computing application of the plurality of computing applications based at least in part on a comparison between the model output and respective information about the plurality of computing applications.

9. The mobile computing device of claim 1, wherein selecting the computing application of the plurality of computing applications based at least in part on the model output comprises:
selecting the computing application of the plurality of computing applications based at least in part on the model output and one or more of:
relevancy to the one or more semantic entities;
a location of the mobile computing device;
past user interactions;
a type of the one or more semantic entities; or
a type of the available action.

10. The mobile computing device of claim 1, wherein the operations further comprise:
receiving a stylization output from the computing application, the stylization output describing aesthetic features associated with displaying the at least one indicator in a user interface; and
displaying the at least one indicator in the user interface based on the stylization output.

11. A computer-implement method for selecting and providing available actions from one or more computing applications to a user, the method comprising:
proactively performing, by one or more computing devices, without receipt of a user input requesting performance:
inputting, by the one or more computing devices, contextual input data into a machine-learned model;
receiving, by the one or more computing devices as an output of the machine-learned model, a model output that describes one or more semantic entities referenced by the contextual input data;
selecting, by the one or more computing devices, a computing application of a plurality of computing applications based at least in part on the model output;
providing, by the one or more computing devices, data descriptive of the one or more semantic entities to the computing application; and
receiving, by the one or more computing devices, an application output from the computing application of the plurality of computing applications in response to providing the data descriptive of the one or more semantic entities to the computing application, wherein the application output received from the computing application describes an available action of the corresponding computing application with respect to the one or more semantic entities; and
performing, by the one or more computing devices, the available action of the computing application, wherein performing the available action causes display of at least one indicator associated with the available action via a display device.

12. The method of claim 11, wherein the contextual input data comprises at least one of information displayed in a user interface, audio played by the one or more computing devices, or ambient audio detected by the one or more computing devices.

13. The method of claim 11, wherein the contextual input data comprises at least one of calendar data or a location of the one or more computing devices.

14. The method of claim 11, wherein the one or more computing devices comprise, or are communicatively coupled to, an artificial intelligence system that includes the machine-learned model and that performs operations, wherein the artificial intelligence system is separate and distinct from the plurality of computing applications but capable of communicating with the plurality of computing applications.

15. The method of claim 14, wherein the artificial intelligence system provides the model output descriptive of the one or more semantic entities to the computing application and receives the application output from the computing application via a pre-defined application programming interface.

16. The method of claim 11, wherein the at least one indicator comprises:
a graphical indicator presented in a user interface; or
an audio indicator played to the user.

17. The method of claim 11, wherein performing the available action of the computing application comprises displaying, by the one or more computing devices, the at least one indicator in at least one of an operating system-level navigation bar in a user interface or a lock screen in the user interface.

18. The method of claim 11, wherein selecting the computing application of the plurality of computing applications based at least in part on the model output comprises:

selecting, by the one or more computing devices, the computing application of the plurality of computing applications based at least in part on a comparison between the model output and respective information about the plurality of computing applications.

19. The method of claim 11, wherein selecting the computing application of the plurality of computing applications based at least in part on the model output comprises:

selecting the computing application of the plurality of computing applications based at least in part on the model output and one or more of:

relevancy to the one or more semantic entities;
        a location of the one or more computing devices;
        past user interactions;
        a type of the one or more semantic entities; or
        a type of the available action.

20. The method of claim 11, wherein the method further comprises:

receiving, by the one or more computing devices, a stylization output from the computing application, the stylization output describing aesthetic features associated with displaying the at least one indicator in a user interface; and displaying, by the one or more computing devices, the at least one indicator in the user interface based on the stylization output.

\* \* \* \* \*